(12) United States Patent
Mohanty et al.

(10) Patent No.: US 11,748,064 B2
(45) Date of Patent: Sep. 5, 2023

(54) ARCHITECTURE FOR ANALYSIS OF VALUE STREAM FOR SOFTWARE PRODUCTS

(71) Applicant: Calibo LLC, Miami, FL (US)

(72) Inventors: Shubhabrata Mohanty, Pune (IN); Anupam Gore, Pune (IN)

(73) Assignee: Calibo LLC, Miami, FL (US)

( * ) Notice: Subject to any disclaimer, the term of this patent is extended or adjusted under 35 U.S.C. 154(b) by 0 days.

(21) Appl. No.: 17/823,233

(22) Filed: Aug. 30, 2022

(65) Prior Publication Data

US 2023/0066141 A1 Mar. 2, 2023

Related U.S. Application Data

(60) Provisional application No. 63/260,723, filed on Aug. 30, 2021.

(51) Int. Cl.
| | |
|---|---|
| *G06F 9/44* | (2018.01) |
| *G06F 8/10* | (2018.01) |
| *G06F 8/60* | (2018.01) |
| *G06F 11/36* | (2006.01) |
| *G06F 8/30* | (2018.01) |
| *G06F 8/34* | (2018.01) |
| *G06F 8/51* | (2018.01) |
| *G06F 8/77* | (2018.01) |
| *G06F 9/451* | (2018.01) |
| *G06F 8/41* | (2018.01) |
| *H04L 41/082* | (2022.01) |

(52) U.S. Cl.
CPC ............ *G06F 8/10* (2013.01); *G06F 8/311* (2013.01); *G06F 8/34* (2013.01); *G06F 8/447* (2013.01); *G06F 8/51* (2013.01); *G06F 8/60* (2013.01); *G06F 8/77* (2013.01); *G06F 9/451* (2018.02); *G06F 11/3608* (2013.01); *H04L 41/082* (2013.01)

(58) Field of Classification Search
None
See application file for complete search history.

(56) References Cited

U.S. PATENT DOCUMENTS

| | | | |
|---|---|---|---|
| 8,108,234 B2 * | 1/2012 | Suenbuel | G06Q 10/063 705/7.11 |
| 11,586,423 B2 * | 2/2023 | Körner | G06F 8/77 |
| 2011/0225163 A1 * | 9/2011 | Lyon | G06F 16/93 707/E17.089 |
| 2014/0096104 A1 * | 4/2014 | Novak | G06F 8/70 717/101 |
| 2018/0046455 A1 * | 2/2018 | Walsh | G06F 8/71 |
| 2020/0117427 A1 * | 4/2020 | McGloin | G06F 8/77 |

* cited by examiner

*Primary Examiner* — Qamrun Nahar
(74) *Attorney, Agent, or Firm* — CHIP LAW GROUP

(57) ABSTRACT

Provided is a method for facilitating for facilitating monitoring of development of software products. The actions/activities executed during the stages of a product development for a software product are tracked. Further, each activity log associated with a corresponding activity is tagged to indicate an association of a corresponding activity log with one of the stages. The activities are further classified into one of a value-added activity or a non-value added activity, based on each activity log. The development of the software product is thus monitored by way of a value stream map that is generated based on the classification of each activity. The value stream map is indicative of an efficiency score for each of the stages.

20 Claims, 10 Drawing Sheets

ARCHITECTURE FOR ANALYSIS OF VALUE STREAM FOR SOFTWARE PRODUCTS

CROSS-REFERENCE TO RELATED APPLICATIONS/INCORPORATION BY REFERENCE

This Patent Application makes reference to, claims priority to, and claims the benefit of U.S. Provisional Application No. 63/260,723, filed Aug. 30, 2021, the contents of which are hereby incorporated herein by reference in its entirety.

FIELD

Various embodiments of the disclosure relate generally to software product development. More specifically, various embodiments of the disclosure relate to an architecture for analysis of value stream at each stage of the development of the software product.

BACKGROUND

In the past few decades, the technological landscape has been radically transformed due to rapid proliferation of digital technology. Many new-age organizations (e.g., start-ups) that specialize in software products (e.g., e-commerce applications, e-learning applications, or ride-sharing applications) have been established and have gained prominence in recent times. Further, a large proportion of legacy organizations (e.g., businesses, governments, non-profit organizations, or the like) have undergone digital transformation to develop software products and/or software solutions for optimizing various operations (e.g., sales, marketing, customer relations, or inventory management). Organizations invest expend significant substantial resources such as time and money in the development of these software products or software solutions. Therefore, it is important for organizations to track the development of software to ensure that their resource (e.g., developers, time, and money) are productively utilized.

Conventional tracking solutions may for example, include manual logging of activities performed by each employee of an organization, and a time spent on each activity by a corresponding employee. Consequently, utilization of resources for development of a software product may be determined by identification of activities performed by stakeholders (e.g., employees) involved in the development of the software product and the time spent by each stakeholder. However, such tracking solutions rely upon accurate and timely logging by the stakeholders. Further, such tracking solutions fail to ensure that the logged activity/time is accurate. Additionally, collation and analysis of manually logged data (e.g., activities and time) is intensive with respect to time and effort.

In light of the foregoing, there exists a need for a technical solution that facilitates improved tracking of development of software products.

Limitations and disadvantages of conventional and traditional approaches will become apparent to one of skill in the art, through comparison of described systems with some aspects of the present disclosure, as set forth in the remainder of the present application and with reference to the drawings.

SUMMARY

Methods, systems, and architecture for analysis of value stream of a software product are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
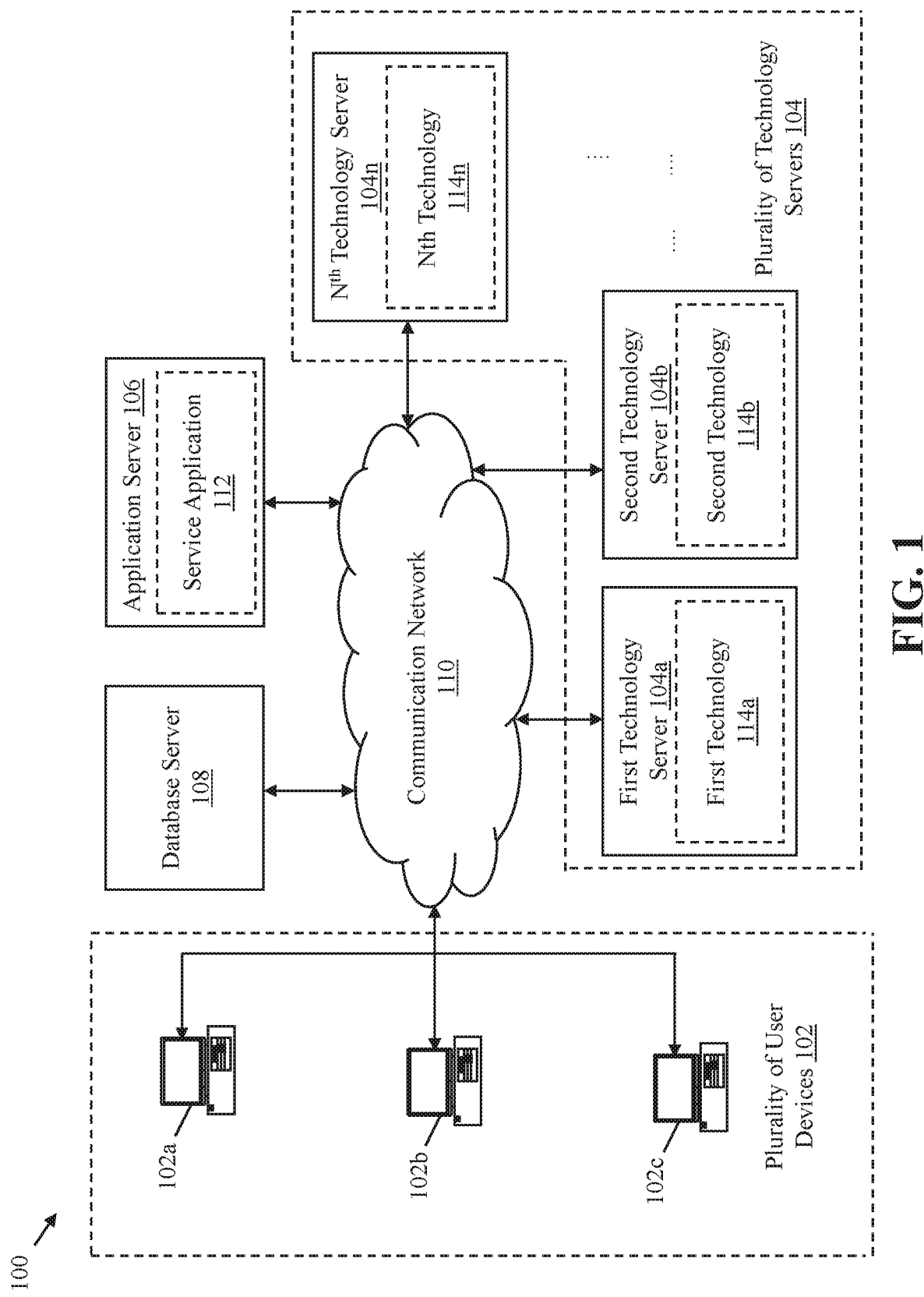
FIG. 1 is a block diagram that illustrates a system environment for managing technologies to facilitate definition, design, development and deployment of a software product, in accordance with an exemplary embodiment of the disclosure.

Architecture, systems, and methods for analysis of value stream at each stage of development of a software product are provided substantially as shown in, and described in connection with, at least one of the figures, as set forth more completely in the claims.

In an embodiment of the present disclosure, a non-transitory computer-readable medium is provided. The non-transitory computer-readable medium has stored thereon, computer executable instruction, which when executed by a computer, cause the computer to implement an architecture to monitor development of software products. The architecture may include an activity watcher, an activity filter, and a value stream engine. The activity watcher may be configured to track a plurality of activities executed during a plurality of stages of product development for a software product. The plurality of stages may include a definition stage, a design stage, a development stage, and a deployment stage. The tracked plurality of activities may include a first set of activities executed during the definition stage, a second set of activities executed during the design stage, a third set of activities executed during the development stage, and a fourth set of activities executed during the deployment stage. Further, the activity filter may be configured to receive, from the activity watcher, a plurality of activity logs. The plurality of activity logs may include first through fourth sets of activity logs associated with the first through fourth sets of activities, respectively. Each activity log of the plurality of activity logs may be indicative of a corresponding activity executed in one of the plurality of stages. The activity filter 406 may be further configured to tag each of the plurality of activity logs with one of a plurality of tags. The tag for each activity log may be indicative of an association of a corresponding activity log with one of the plurality of stages. The value stream engine may be configured to classify each activity of the first through fourth sets of activities as one of a value-added activity or a non-value added activity, based on the plurality of activity logs. The value stream engine may be further configured to generate a value stream map for the product development of the software product, based on the classification of each activity of the first through fourth sets of activities. The value stream map may be indicative of an efficiency score for each of the plurality of stages.

In another embodiment of the present disclosure, a system to monitor development of software products is disclosed. The system may include processing circuitry. The processing circuitry may be configured to track a plurality of activities executed during a plurality of stages of product development for a software product. The plurality of stages may include a definition stage, a design stage, a development stage, and a deployment stage. The tracked plurality of activities may include a first set of activities executed during the definition stage, a second set of activities executed during the design stage, a third set of activities executed during the development stage, and a fourth set of activities executed during the deployment stage. The processing circuitry may be further configured to generate a plurality of activity logs that may include first through fourth sets of activity logs associated with the first through fourth sets of activities, respectively. Each activity log of the plurality of activity logs may be indicative of a corresponding activity executed in one of the plurality of stages. The processing circuitry may be further configured to tag each of the plurality of activity logs with one of a plurality of tags. The tag for each activity log may be indicative of an association of a corresponding activity log with one of the plurality of stages. The processing circuitry may be further configured to classify each activity of the first through fourth sets of activities as one of a value-added activity or a non-value added activity, based on the plurality of activity logs. The processing circuitry may be further configured to generate a value stream map for the product development of the software product, based on the classification of each activity of the first through fourth sets of activities. The value stream map may be indicative of an efficiency score for each of the plurality of stages.

In another embodiment of the disclosure, a method for monitoring development of software products is disclosed. The method may include tracking a plurality of activities executed during a plurality of stages of product development for a software product by processing circuitry. The plurality of stages may include a definition stage, a design stage, a development stage, and a deployment stage. The tracked plurality of activities may include a first set of activities executed during the definition stage, a second set of activities executed during the design stage, a third set of activities executed during the development stage, and a fourth set of activities executed during the deployment stage. The method may further include generating a plurality of activity logs that may include first through fourth sets of activity logs associated with the first through fourth sets of activities, respectively, by the processing circuitry. Each activity log of the plurality of activity logs may be indicative of a corresponding activity executed in one of the plurality of stages. The method may further include tagging each of the plurality of activity logs with one of a plurality of tags by the processing circuitry. The tag for each activity log may be indicative of an association of a corresponding activity log with one of the plurality of stages. The method may further include classifying each activity of the first through fourth sets of activities as one of a value-added activity or a non-value added activity, based on the plurality of activity logs, by the processing circuitry. The method may further include generating a value stream map for the product development of the software product, based on the classification of each activity of the first through fourth sets of activities by the processing circuitry. The value stream map may be indicative of an efficiency score for each of the plurality of stages.

In some embodiments, the architecture may further include a relationship mapper. The relationship mapper may be configured to generate a plurality of nodes. Each of the plurality of nodes may correspond to an activity of the first through fourth sets of activities. Further, the relationship mapper may be configured to generate, based on a relationship matrix, a plurality of edges between the plurality of nodes. The relationship matrix may be indicative of a correlation among the first through fourth sets of activities. An edge formed between any two nodes may be indicative of a correlation between activities that correspond to the two nodes.

In some embodiments, a combination of the plurality of nodes and the plurality of edges may correspond to a traceability map. The traceability map may be indicative of causal relationship between the first through fourth sets of activities.

In some embodiments, the architecture may further include a user action designer. The user action designer may be configured to render a user interface (UI) on a user device of a user and present the value stream map and the traceability map on the rendered UI.

In some embodiments, each activity of the first through fourth sets of activities may be linked to a user identifier of a user who initiated a corresponding activity. Each activity log of the first through fourth sets of activity logs may include the user identifier of the user who initiated the corresponding activity.

In some embodiments, the activity filter may be further configured to map, based on release train information associated with a plurality of releases of the software product, each of the tagged plurality of activity logs to one or more releases of the plurality of releases. The generated value stream map may be indicative of an efficiency score for each of the plurality of releases of the software product.

In some embodiments, the first set of activities that are executed during the definition stage may include creation of a set of business requirements, creation of a set of agile epics, creation of a set of agile stories, or creation of a set of approval workflows for the set of business requirements.

In some embodiments, the second set of activities that are executed during the design stage may include creation of a set of architecture documents for the software products, updating of one or more architecture documents of the set of architecture documents, or creation of a set of approval workflows for the set of architecture documents.

In some embodiments, the third set of activities that are executed during the development stage may include selection of a technology stack for development of the software product, usage of a set of editors to write code for the selected technology stack, or creation of a set of approval workflow for the selection of the technology stack.

In some embodiments, the fourth set of activities that are executed during the deployment stage may include creation of a set of deployment environments for deploying a plurality of microservices associated with the software product, creation of a set of continuous integration/continuous deployment (CI/CD) pipelines for each of the plurality of microservices, triggering of the set of CI/CD pipelines for each of the plurality of microservices, or provisioning of a set of virtual machines at a cloud technology for the deployment of each of the plurality of microservices.

In some embodiments, the method may further include generating a plurality of nodes by the processing circuitry. Each of the plurality of nodes may correspond to an activity of the first through fourth sets of activities. The method may further include generating, based on a relationship matrix, a plurality of edges between the plurality of nodes by the processing circuitry. The relationship matrix may be indicative of a correlation among the first through fourth sets of activities. An edge formed between any two nodes may be indicative of a correlation between an activity that corresponds to each of those two nodes.

In some embodiments, the method may further include rendering a user interface (UI) on a user device of a user and presenting the value stream map and the traceability map on the rendered UI, by the processing circuitry.

In some embodiments, the method may further include mapping, based on release train information associated with a plurality of releases of the software product, each of the tagged plurality of activity logs to one or more releases of the plurality of releases, by the processing circuitry. The generated value stream map may be indicative of an efficiency score for each of the plurality of releases of the software product.

These and other features and advantages of the present disclosure may be appreciated from a review of the following detailed description of the present disclosure, along with the accompanying figures in which like reference numerals refer to like parts throughout.

FIG. 1 is a block diagram that illustrates a system environment for managing technologies to facilitate definition, design, development and deployment of a software product, in accordance with an exemplary embodiment of the disclosure. With reference to FIG. 1, a system environment 100 for managing technologies to facilitate definition, design, development, and deployment of a software product is shown. The system environment 100 is shown to include a plurality of user devices 102 (e.g., first through third user devices 102a-102c) and a plurality of technology servers 104 (e.g., first through $n^{th}$ technology servers 104a-104n). The system environment 100 is further shown to include an application server 106, a database server 108, and a communication network 110. The plurality of user devices 102, the plurality of technology servers 104, the application server 106, and the database server 108 may communicate with each other by way of the communication network 110.

The first user device 102a may include suitable logic, circuitry, interfaces and/or code, executable by the circuitry, that may be configured to execute one or more instructions based on user input received from a corresponding user. The first user device 102a may be further configured to execute a service application 112 that is hosted by the application server 106. In one embodiment, the service application 112 may be a standalone application installed on the first user device 102a. In another embodiment, the service application 112 may be accessible by way of a web browser installed on the first user device 102a. Examples of the first user device 102a may include, but are not limited to, a personal computer, a laptop, a smartphone, a tablet, or the like. The second and third user devices 102b and 102c may be functionally similar to the first user device 102a.

In one embodiment, the plurality of user devices 102 may be operated by a corresponding plurality of users associated with an organization. Examples of the organization may include businesses, governments, non-profit organizations, or the like. In a non-limiting example, the organization may intend to develop a software product (e.g., a software application). The plurality of users may utilize the plurality of user devices 102 for definition, design, development, deployment, operation, monitoring, and/or maintenance of the software product. Examples of the software product may include software applications such as, but not limited to, e-commerce applications, video streaming applications, productivity applications, e-learning applications, or the like. It will be apparent to those of skill in the art that examples of the software product are not limited to those mentioned above. In an actual implementation, the software product may include any enterprise or consumer software application.

The first technology server 104a may include suitable logic, circuitry, interfaces and/or code, executable by the circuitry, that may be configured to host a first technology 114a. In one embodiment, the first technology 114a may be one of a plurality of technologies available for designing, developing, deploying, maintaining, or monitoring the software product. In other words, the first technology 114a may be a software application or a software solution that is available for the design, development, deployment, security, operation, maintenance, or monitoring of the software product. In another embodiment, the first technology 114a may be a software application or a software solution that facilitates various operations pertaining to data analysis such as, but not limited to, data sourcing, data ingestion, data storage, data analysis, or data visualization. The first technology 114a may correspond to one of a software-as-a-service (SaaS), a platform-as-a-service (PaaS), or an infrastructure-as-a-service (IaaS). The first technology 114a may include any application that may be required by the organization at any phase or stage during a software development lifecycle (SDLC) or a data analytics/data science life cycle (DALC/DSLC) of the software product. For the sake of brevity, the terms "DALC" and "DSLC" are interchangeably used throughout the disclosure. In other words, the first technology 114a may include any application required for facilitating definition, design, development, or deployment of the software product. For the sake of brevity, the terms "software product", "product", and "software application" are used interchangeably throughout the entire disclosure.

For example, the first technology 114a may include a technology (e.g., software application, software solution, or software tool) for requirement analysis, a technology for planning or project management, or a technology for software architectural design. The first technology 114a may further include a technology for software development, a technology for software testing, a technology for software deployment, a technology for software maintenance, or a technology for document management. The first technology 114a may further include a technology for data storage (e.g., cloud data storage), a technology for data sourcing, a technology for data analytics, a technology for data visualization, or the like.

Throughout the disclosure, the terms "technology", "technology service", "technology platform", or "tool" are used to refer to any software application or tool that may be available for facilitating the definition, the design, the development, or the deployment of the software product. Technologies available for various stages or phases of the SDLC or the DALC of the software product may be well known to those of skill in the art. Examples of the first technology 114a may include, but are not limited to, Microsoft Azure®, Amazon web services (AWS®), Snowflake®, Jira®, or the like.

The first technology server 104a may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the first technology server 104a may be compatible with multiple operating systems.

The second through $n^{th}$ technology servers 104b-104n may be functionally similar to the first technology server 104a. The second through $n^{th}$ technology servers 104b-104n may host the second through $n^{th}$ technologies 114b-114n, respectively. The second through $n^{th}$ technology servers 104b-104n may each correspond to any technology that is required for facilitating the SDLC or the DALC of the software product. Hereinafter, for the sake of brevity, the first through third technologies 114a-114c are designated and referred to as "first plurality of technologies 114".

The application server 106 may include suitable logic, circuitry, interfaces, and/or code, executable by the circuitry, that may be configured to host the service application 112. The service application 112 hosted by the application server 106 may be an open pro-code PaaS that enables end-to-end design, development, deployment, operation, and maintenance of the software product. The application server 106 may be configured to enable, for the plurality of user devices 102 associated with the plurality of users, access to features provided by the service application 112. The application server 106 may be configured to provide a single platform to various stakeholders (e.g., business partners, developers, product designers, management, or the like) to collaborate at various stages of development of the software product. The open pro-code PaaS may enable the organization to select technologies (e.g., the first plurality of technologies 114) for the design, development, deployment, operation, and maintenance of the software product, based on requirements/choices of the organization. In other words, the application server 106 enables, by way of the service application 112, selection/creation of a technology stack required for the SDLC and/or the DALC of the software product. Upgrades and licenses for the selected technologies may be managed by the application server 106. Each of the first plurality of technologies 114 may be one of a third-party technology or a proprietary technology. In a non-limiting example, a proprietary technology may be a technology that is associated with an entity that manages or owns the application server 106 (e.g., the service application 112). In such a scenario, the proprietary technology (e.g., technology platform) may be hosted/executed by the application server 106 itself or by a different server (e.g., one of the plurality of technology servers 104).

A technology stack may refer to a set of programming languages (e.g., Java, Swift, Scala, or Python), frameworks (e.g., Ruby on Rails, Django, Databricks, Hadoop, MLFlow, or Bootstrap), and/or technologies (e.g., tools or technology platforms for development, continuous integration-continuous deployment, data analytics, or the like) that are required for the SDLC and/or the DALC of the software product. In a non-limiting example, the technology stack for the SDLC of the software product may include a client-side component (e.g., frontend) and a server-side component (e.g., backend). The client-side component may include a frontend framework (e.g., AngularJS, React, jQuery, or the like). The server-side component may include a backend framework (e.g., Ruby on Rails, Django, or .Net), operating systems (e.g., Linux, Android, or iOS), programming languages (e.g., Java, Ruby, or Python), and infrastructure and load balancing tools (e.g., AWS, Microsoft Azure, Cloudflare, or Apache). The server-side component may further include data storage and querying tools (e.g., MongoDB, RedShift, Snowflake, or MySQL) and monitoring and performance tools (e.g., AppDynamics, Dynatrace, or Datadog).

The technology stack may further include tools or applications for business intelligence (BI), application programming interface (API) services, product analytics, or the like. Examples of the tools/applications for BI include, but are not limited to, SAP BusinessObjects, Tableau, Looker, Microsoft Power BI, or the like. Examples of the tools/applications for API services include, but are not limited to, Segment, Google Apigee, Zapier, or the like. Examples of the tools/applications for product analytics include, but are not limited to, Heap, Countly, Mixpanel, or the like. The technology stack may further include other tools or applications for version control (e.g., GitHub, Gitlab, or AWS CodeCommit), continuous integration/continuous deployment (e.g., Jenkins, Bamboo, or Codeship), testing (e.g., Selenium, TestingWhiz, or TestComplete), or the like. Selection of the technology stack is well known to those of skill in the art.

The application server 106 enables an integration and orchestration of services provided by the various technologies (e.g., the selected set of technologies) of the technology stack. The technology stack may include PaaS, SaaS, IaaS technologies/applications provided by various technologies such as, AWS, Microsoft Azure, Snowflake, Jira, R studio, DataBricks, GitHub, or the like.

Examples of the application server 106 may include a cloud-based server, a local server, a group of centralized servers, a group of distributed servers, or the like.

The application server 106 may facilitate, for the plurality of user devices 102, access to various technologies (e.g., technology platforms) by way of the service application 112. In an example, the organization may use Microsoft Azure and/or AWS for storage of data and Snowflake for analysis of data stored on Microsoft Azure and/or AWS. Therefore, the application server 106 may enable access of Microsoft Azure and AWS via the service application 112 to store the data. Further, the application server 106 integrates services of Microsoft Azure platform and AWS with Snowflake such that the data retrieved from Microsoft Azure and AWS is communicated to Snowflake for analysis. Details of one or more services provided by the service application 112 hosted by the application server 106 are described later in the disclosure.

In an embodiment, the application server 106 may communicate with the plurality of technology servers 104 associated with corresponding technologies to enable each user device, of the plurality of user devices 102, to access one or more services provided by said technologies. In another embodiment, multiple technologies may be hosted on a single platform server (e.g., the first technology server 104a), hence the application server 106 may communicate with the first technology server 104a to enable each user device 102 to access one or more services provided by said technologies.

The application server 106 may be implemented by one or more processors, such as, but not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the application server 106 may be compatible with multiple operating systems.

The database server 108 may include suitable logic, circuitry, interfaces, and/or code, executable by the circuitry, that may be configured to store data and perform one or more database operations associated with the stored data. Examples of the database operations may include, but are not limited to, receiving, storing, processing, and transmitting data pertaining to use of the service application 112 by the plurality of users. The database server 108 may further receive, store, process, and transmit data associated with the plurality of users. In an embodiment, the database server 108 may be further configured to receive, store, process, and transmit data associated with usage of the plurality of user devices 102 by the plurality of users. The database server 108 may include a database such as, but not limited to, Hadoop®, MongoDB®, MySQL®, NoSQL®, Oracle®, or the like.

Examples of the database server 108 may include, but are not limited to, a personal computer, a laptop, a mini-computer, a mainframe computer, a cloud-based server, a network of computer systems, or a non-transient and tangible machine executing a machine-readable code. For the sake of brevity, the application server 106 and the database server 108 have been shown as separate systems. However, in some embodiments, the database server 108 may be integrated within the application server 106. In such scenarios, functions performed by the database server 108 may be performed by the application server 106 without deviating from the scope of the disclosure.

The communication network 110 may include suitable logic, circuitry, interfaces, and/or code, executable by the circuitry, that is configured to facilitate communication among various entities (such as the plurality of user devices 102, the plurality of technology servers 104, the application server 106, and the database server 108) described in FIG. 1. Examples of the communication network 110 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities (such as the plurality of user devices 102, the plurality of technology servers 104, the application server 106, and the database server 108) in the system environment 100 may be communicatively coupled to the communication network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

It will be apparent to a person skilled in the art that the system environment 100 described in conjunction with FIG. 1 is exemplary and does not limit the scope of the disclosure. In other embodiments, the system environment 100 may include different or additional components configured to perform similar or additional operations.

Figure 2:
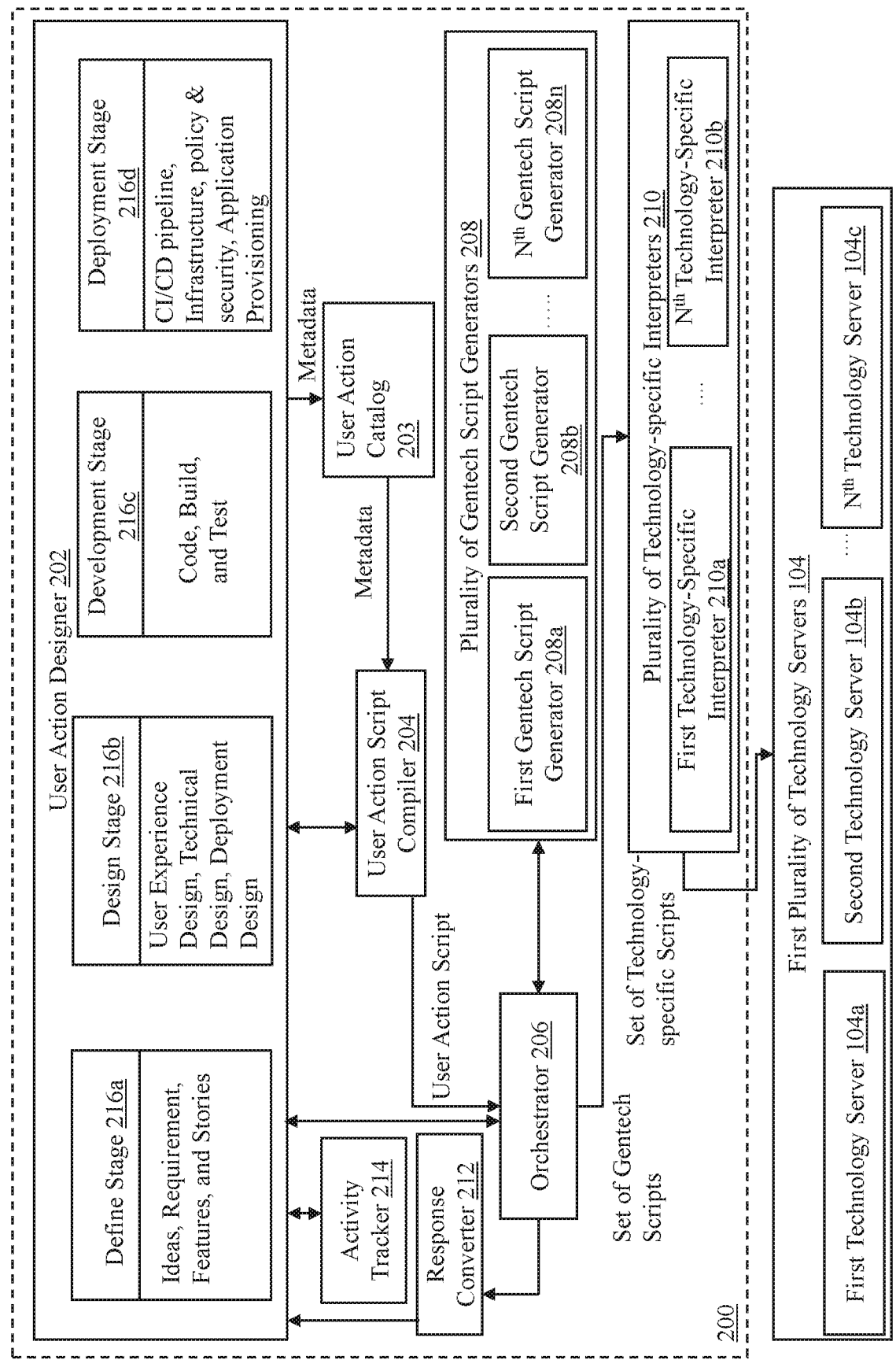
FIG. 2 is a block diagram that illustrates a primary architecture of a service application of FIG. 1, in accordance with an exemplary embodiment of the disclosure.
Figure 3:
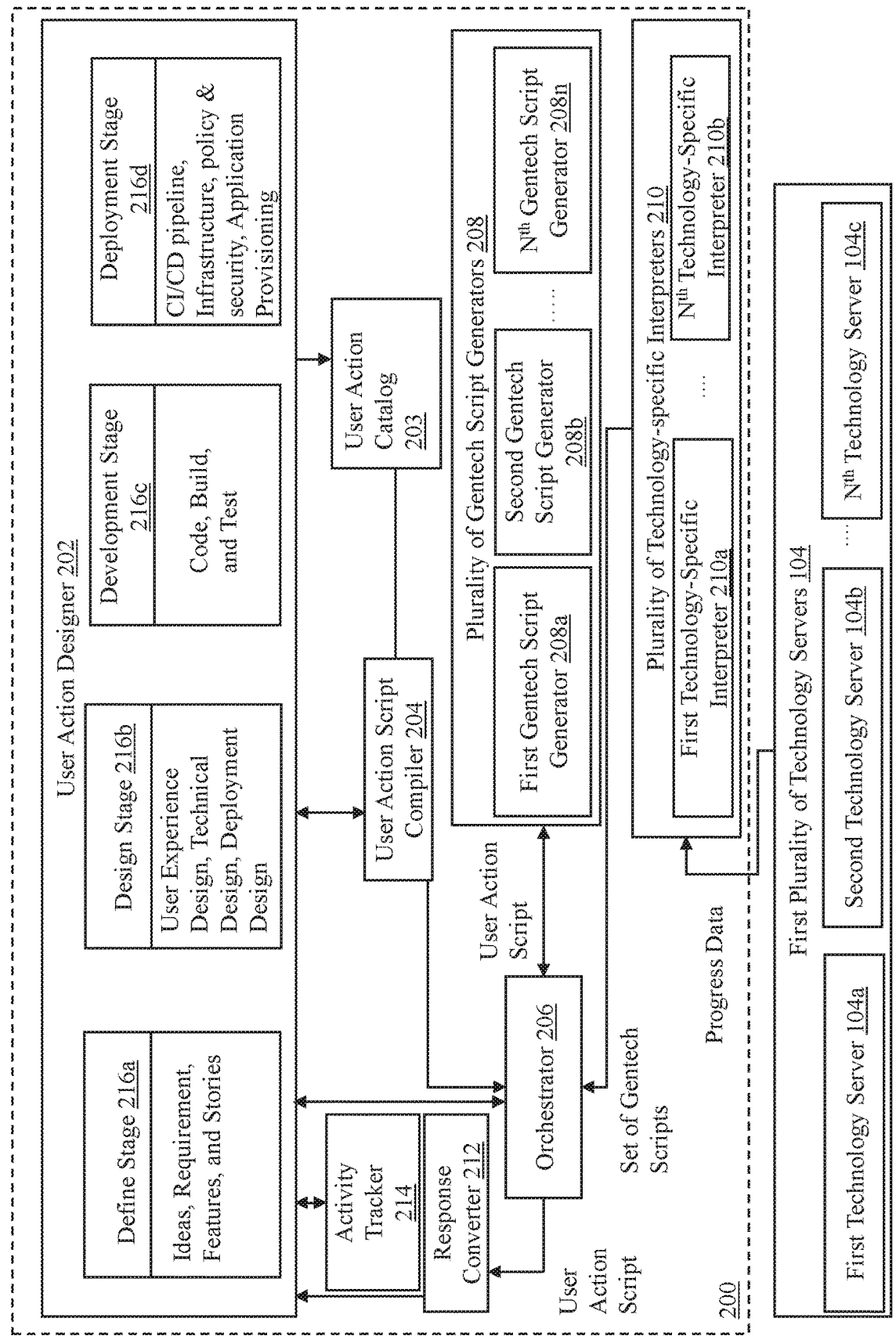
FIG. 3 is a block diagram that illustrates the primary architecture of the service application, in accordance with another exemplary embodiment of the disclosure.

FIGS. 2 and 3 are block diagrams that illustrate a primary architecture of a service application, in accordance with an exemplary embodiment of the disclosure. With reference to FIGS. 2 and 3, block diagrams 200 and 300 that illustrate a primary architecture of the service application 112 are shown. For the sake of brevity, the primary architecture of the service application 112 is simply referred to as "architecture 200" throughout the disclosure.

FIG. 2 illustrates a flow of information or data between components of the architecture 200 of the service application 112 during forward-channel communication, while FIG. 3 illustrates a flow of information or data between the components of the architecture 200 of the service application 112 during reverse-channel communication. Forward channel communication refers to communication (e.g., messages) initiated by the service application 112 and received by the first plurality of technologies 114 (e.g., the first plurality of technology servers 104). In one example, the forward-channel communication may be initiated by the service application 112 based on one or more user actions of the user (e.g., the plurality of users) on the service application 112 to prompt one or more technologies of the first plurality of technologies 114 to execute a set of operations. Reverse channel communication may refer to communication received by the service application 112 from the first plurality of technologies 114. In one example, the reverse channel communication may refer to handling of communication (e.g., messages) received from the one or more technologies by the service application 112, in response to the forward-channel communication.

The architecture 200 is shown to include a user action designer 202, a user action catalog 203, a user action script compiler 204, an orchestrator 206, first through $n^{th}$ gentech script generators 208a-208n, first through $n^{th}$ technology-specific interpreters 210a-210n, and a response converter 212. The first through $n^{th}$ gentech script generators 208a-208n are collectively designated and referred to as "plurality of gentech script generators 208", and the first through $n^{th}$ technology-specific interpreters 210a-210n are referred to as "plurality of technology-specific interpreters 210". The architecture 200 of the service application 112 is further shown to include an activity tracker 214. The architecture 200 of the service application 112 may further include a product orchestration designer (shown in FIG. 4). The product orchestration designer is not shown in FIGS. 2 and 3 in order to not obscure the disclosure. The service application 112 enables implementation of various stages of product development for the software product. The various stages of product development may include, but are not limited to, a define stage, a design stage, a development stage, and a deployment stage (shown in FIG. 4). The various stages of product development of the software product are explained in conjunction with FIG. 4.

Figure 4:
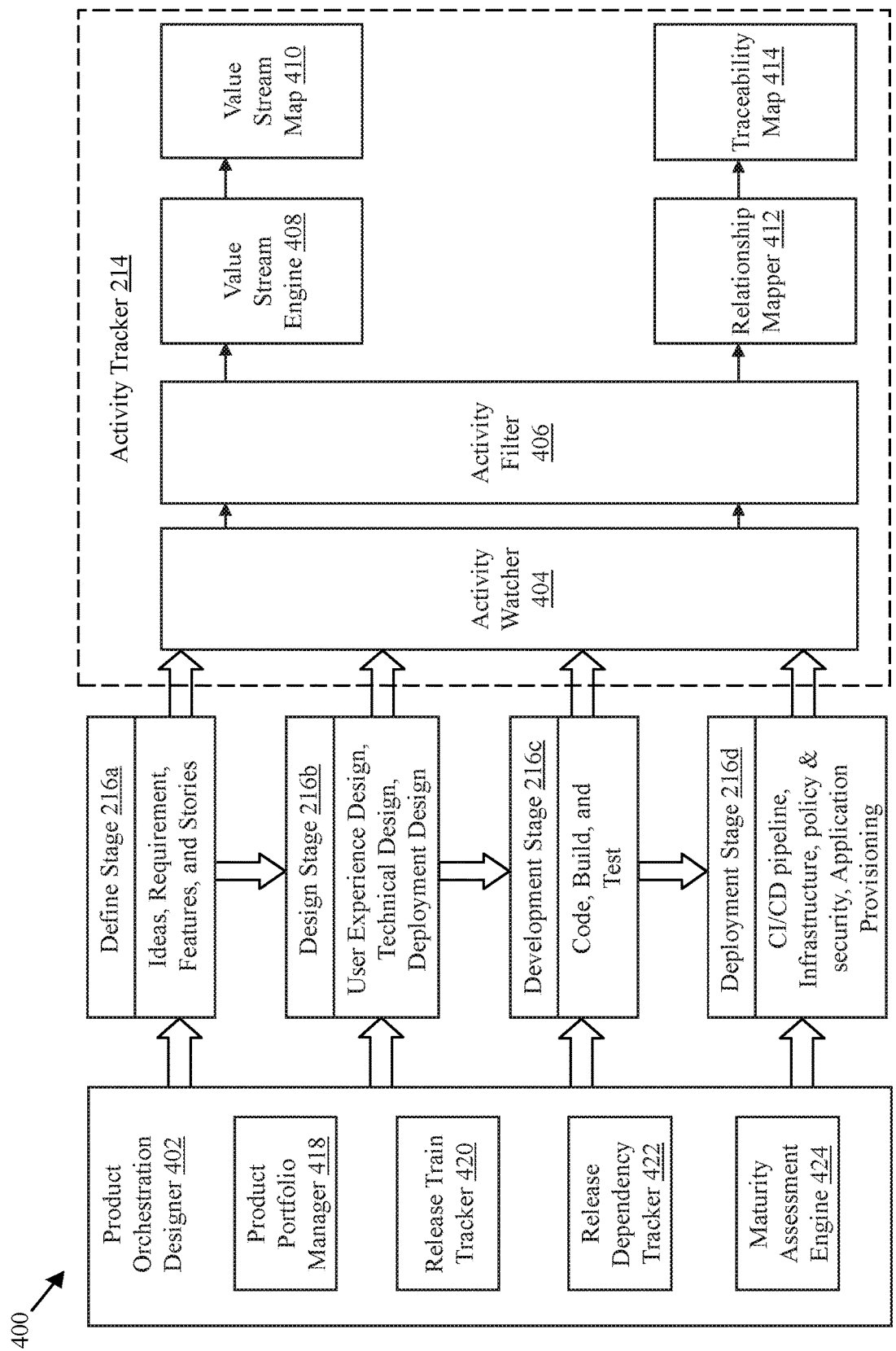
FIG. 4 is a block diagram that illustrates an activity tracker and a product orchestration designer of the service application, in accordance with an exemplary embodiment of the disclosure.

Referring now to FIG. 4, a block diagram 400 that illustrates the activity tracker 214 and the product orchestration designer, in accordance with an exemplary embodiment of the disclosure, is shown. Hereinafter, the product orchestration designer is designated and referred to as "product orchestration designer 402". FIG. 4 also illustrates the various stages of product development for the software product—the define stage 216a, the design stage 216b, the development stage 216c, and the deployment stage 216d. For the sake of brevity, the various stages of product development of the software product are collectively designated and referred to as "plurality of stages 216". The define stage 216a, the design stage 216b, the development stage 216c, and the deployment stage 216d are collectively referred to as "D4". For the sake of brevity, D4 is explained with respect to the software product.

During the define stage 216a, business or technology ideas, requirements, feasibility, risks, cost, or the like associated with the yet-to-be-developed software product may be analyzed and defined. Further, during the define stage 216a, roles for users (e.g., the plurality of users) in the development of the software product may be defined. In other words, the define stage 216a may be a stage associated with an ideation and/or (corresponding) pre-design analysis of the software product. An ideation process may include sourcing of ideas (e.g., brainstorming) from various stakeholders (e.g., users associated technology-oriented roles such as developers, users associated business-oriented roles such as managers or executives in the organization, or the like) for developing new software products or adding features in existing software products. The ideation process may further include evaluation of these ideas by the stakeholders, filtering of these ideas, and/or refinement of these ideas. In one embodiment, the ideation process may further include creation of a prototype of the software product (for example, the software application) or a proof-of-concept of the software product. In one embodiment, the ideation process may further include evaluation or analysis (e.g., by the stakeholders) of requirements, risks, and/or costs associated with the development of the software product.

Such analysis and ideation ensure mitigation or avoidance of various issues that may be faced during subsequent stages of the SDLC of the software product. In one embodiment, the define stage 216a may also include creation of a plan (e.g., a project plan) for design, development, and deployment of the software product. Such ideation for the software product may require interaction and collaboration among the stakeholders. The application server 106 may provide a single/unified platform that enables the various stakeholders to collaborate and perform various actions (e.g., conduct discussions, conduct presentations, perform research, perform analysis, or the like) to facilitate the ideation process. In an example, the stakeholders may collaborate with each other by way of one or more collaboration tools (e.g., Microsoft Teams®, Zoom®, Google Meet®, Slack®, or the like) supported by the service application 112. The stakeholders may have discussions, exchange of ideas, information, data, files, or the like, by way of such collaboration tools supported by the service application 112. Beneficially, such collaboration among the stakeholders facilitates seamless and efficient ideation for the software product.

Further, during the define stage 216a, a documentation process for the SDLC and/or the DALC of the software product may be initiated. The documentation process may include generation of documents to document (or collate) various inputs and outputs of the ideation process. The generated documents may include, but are not limited to, the ideas sourced from the stakeholders, results of the evaluation of the ideas, a set of finalized ideas, the proof-of-concept of the software product, a result of the evaluation of the risks, details of the prototype or the proof-of-concept of the software product, and the cost associated with the development of the software product. The generated documents may further include a workflow associated with a working of the software product, a project plan for the development of the software product, and/or creation of agile features. In an embodiment, the service application 112 may enable the plurality of users to select one or more technologies (e.g., Confluence®, Google Docs®, Sharepoint®, or the like) for documentation of the various inputs and outputs associated with the define stage 216a to store various files, links, attributes, tags, or the like associated with the software product.

In an embodiment, the service application 112 may enable the plurality of users to implement the define stage 216a, for the software product, by way of one or more pre-defined templates. In another embodiment, the service application 112 may enable the plurality of users to implement the define stage 216a by defining product portfolios (e.g., software product portfolios), defining products (e.g., software products), or defining/creating business requirements. The service application 112 may further enable the plurality of users to implement the define stage 216a by defining features, epics, or stories or the like, for the development of the software product. The define stage 216a may be followed by the design stage 216b.

During the design stage 216b, an architecture and technical design of the software product may be created or prepared. Based on the ideas, requirements, or the like that are defined at the define stage 216a, one or more tools, technologies, and/or design philosophies may be adopted (e.g., by the plurality of users) for developing the software product. In one embodiment, the design stage 216b may include creation of user interface (UI) designs (e.g., user interface design mock-ups), user experience (UX) designs, technical designs, or the like associated with the software product. The UI design may provide an estimate of a layout and architecture of one or more UIs of the software product. The UX design for the software product may yield an estimation of an experience that may be encountered by users while interacting with the one or more UIs of the software product. The technical designs may refer to an estimation of programming languages and technologies, and corresponding configurations to be used for facilitating the SDLC of the product. The design stage 216b of the software product may also involve creating or preparing designs (e.g., UI design, user experience design, and/or technical design) for different versions of the software product.

Further, the design stage 216b allows for a mapping of the ideas and requirements associated with the define stage 216a with various designs (e.g., UI design, user experience design, technical design, or the like) generated during the design stage 216b. Further, the design stage 216b ensures a readiness of the plurality of users as well as the service application 112, in terms of ideas, requirements, and technical clarity for proceeding with subsequent stages (development stage 216c and deployment stage 216d) associated with SDLC of the software product. The service application 112 may support integration or usage of various tools and/or technologies (e.g., Figma®, Sketch®, Invision®, Confluence®, Miro®, Google Docs®, or the like) that may be required for implementing the design stage 216b. The design stage 216b is followed by the development stage 216c of the SDLC of the software product.

During the development stage 216c, the technology stack for developing the software product may be selected. Further, during the development stage 216c, the software product (e.g., the software application) may be built (e.g., created or developed) using the selected technology stack. For example, the selected technology stack may be made available to the plurality of users (e.g., developers) for the development of the software product. Further, one or more technologies for code development (e.g., code editors such as Visual Studio, Eclipse, or the like) may be available to the plurality of users. Similarly, various technologies for version control or source code management (e.g., GitHub, Gitlab, BitBucket or the like) may be used for storage of code, libraries, files, or the like associated with the software product. Further, the development stage 216c also enables users (e.g., the plurality of users) to commit, execute, and test the code for the software product. The development stage 216c may be followed by the deployment stage 216d.

In an embodiment, the development stage 216c may further include a testing sub-stage. During the testing sub-stage, code committed to a repository (e.g., the one or more repositories) may be tested using various one or more unit testing tools. Examples of the one or more unit testing tools include, but are not limited to, NUnit®, JUnit®, TestNG®, or the like. The detected bugs, anomalies, and/or errors may be reported (e.g., to a user who committed the Java code snippet and/or the plurality of users) on the service application 112. In one embodiment, the detected bugs, anomalies, errors, or the like may be debugged or removed automatically by way of one or more features provided by the service application 112, various technologies, or a manual input provided via the plurality of the user devices 102. In other words, the service application 112 allows for testing of the software product to find defects therein. Further, the service application 112 enables the plurality of users to verify whether the developed product behaves as expected and according to definitions and requirements ideated and defined during the define stage 216a.

The deployment stage 216d refers to deployment or release of the software product in various deployment environments (e.g., a development environment, a quality analysis/QA environment, a pre-production environment, a production environment, or the like). The deployment stage 216d may include management of operations to deploy the software product. The deployment of the software product could be manual, scheduled, or automated. In one embodiment, the deployment stage 216d may facilitate implementation of a continuous integration/continuous deployment (CI/CD) pipeline that enables automated integration and deployment, and/or delivery of the software product. The service application 112 allows for use of one or more CI/CD technologies or CI/CD automation tools (e.g., Jenkins, Circle CI, or the like) for implementation of the CI/CD pipelines. Various other tools, services, and/or technologies may be used for implementing various stages in the CI/CD pipeline, in conjunction with the one or more CI/CD automation tools.

Examples of the various stages in the CI/CD pipeline may include, but are not limited to, version control, static application security testing (SAST), building, unit testing, integration testing, dynamic application security testing (DAST), or the like. Examples of tools and technologies for version control include, but are not limited to, Gitlab, GitHub, or the like. Examples of tools and technologies for SAST include, but are not limited to, SonarQube®, Veracode static Analysis®, Codacy®, or the like. The service application 112 further allows the software product to be deployed in a cloud agnostic and technology agnostic manner. The service application 112 may enable the deployment of the software product on any cloud platform (e.g., cloud technology).

In an embodiment, the deployment stage 216d may enable integration with tools, services, or technologies for employing concepts of policy as code (PaC), Infrastructure as code (IaC), and Security as code (SaC).

For the sake of brevity, the SDLC of the software product is assumed to include only above-mentioned stages. It will be apparent to those of skill in the art that the SDLC of the software product may include other stages without deviating from the scope of the disclosure. Stages included in the DALC of the software product will be explained in conjunction with later figures.

Referring back to FIG. 2, the user action designer 202 renders, on a user device (e.g., the first user device 102a), a UI that presents the first plurality of technologies 114 available for facilitating (e.g., implementing or executing) the plurality of stages 216 of the product development of the software product. Examples of the plurality of technologies may include, but are not limited to, technologies for project management, technology for version control or repository management (e.g., code commits), technologies for SAST, or technologies for DAST. Examples of the first plurality of technologies 114 may further include technologies for CI/CD pipeline automation (e.g., orchestration), technologies for infrastructure provisioning, technologies for cloud deployment, or technologies for monitoring of the software product after deployment of the software product.

Examples of the first plurality of technologies 114 may further include technologies for data ingestion, technologies for data warehousing or data storage, technologies for data analytics, or technologies for data visualization. In other words, the UI rendered by the user action designer 202 presents multiple technologies (e.g., tens, hundreds, or thousands of technologies) available for performing various sets of operations (e.g., code commit, continuous integration, project management, data analytics, or the like) associated with the plurality of stages 216. The first plurality of technologies 114 are available for performing a first plurality of operations associated with the plurality of stages 216. The first plurality of operations may include any operation associated with the define stage 216a, the design stage 216b, the development stage 216c, or the deployment stage 216d. Further, the first plurality of operations may include any operation that is required for the product development, the maintenance, or the operation of the software product.

Each of the first plurality of technologies 114 may be available for performing one or more operations of the first plurality of operations. For example, a first technology of the first plurality of technologies 114 may be available for performing or facilitating project management (e.g., agile project management) for the product development of the software product. In other words, the first technology of the first plurality of technologies 114 may be available for implementing the define stage 216a for the product development of the software product. In another example, a second technology of the first plurality of technologies 114 may be available for implementing multiple stages (e.g., performing multiple operations) in a data pipeline associated with the software product. Each of the first plurality of operations may be associated with multiple technologies available for performing a corresponding operation. For example, a first operation (e.g., repository management) may be executed by a second plurality of technologies included in the first plurality of technologies 114. In other words, the second plurality of technologies that are available for executing (e.g., performing) the first operation are a subset of the first plurality of technologies 114. Similarly, a second operation (e.g., cloud deployment) may be associated with a third plurality of technologies included in the first plurality of technologies 114.

The UI rendered on the first user device 102a may be indicative of the first plurality of technologies 114 and the first plurality of operations available for facilitating the plurality of stages 216. In one embodiment, a first technology for performing an operation associated with the plurality of stages 216 may be selected by the user by way of the rendered UI. In other embodiment, one or more operations required for implementing one or more stages of the plurality of stages 216 may be selected by the user by way of the rendered UI. For the sake of brevity, it is assumed that a first set of operations of the first plurality of operations is selected by the user. In a non-limiting example, the first set of operations includes one or more operations associated with a single workflow (e.g., data ingestion, data visualization, definition of a sprint for agile product development, or the like). The workflow may include various operations or sub-operations that are to be executed for completion of an execution of the first set of operations. The user action designer 202 may determine, based on the selection of the first set of operations and the first plurality of technologies 114, a second plurality of technologies available for executing the first set of operations. The second plurality of technologies is a subset of the first plurality of technologies 114. In other words, the first plurality of technologies include the second plurality of technologies. In an exemplary scenario, if the first set of operations corresponds to data ingestion (e.g., a single workflow), the second plurality of technologies may include technologies, of the first plurality of technologies, that are available for performing the first set of operations. In some embodiment, the second plurality of technologies may include various technologies, each of which is available for executing one or more operations (or sub-operations) included in a workflow for data ingestion. For example, the second plurality of technologies may include technologies for execution of a data extraction operation, a data transformation operation, and a data loading operation that may be present in the workflow for data ingestion.

Based on the determination of the second plurality of technologies, the user action designer 202 may present the second plurality of technologies on the UI rendered on the first user device 102a. The user may select one or more technologies of the second plurality of technologies for executing the first set of operations. In a non-limiting example, it is assumed that the user selects a first technology of the second plurality of technologies for executing the first set of operations.

The user action designer 202 records (e.g., captures) a first plurality of user actions performed by the user on the UI. In other words, the first plurality of user actions include user actions associated with the plurality of stages 216 (e.g., one of the plurality of stages 216) and performed by the user on the UI rendered on the first user device 102a. The user action designer 202 may generate, based on the recorded first plurality of user actions, metadata associated with the first plurality of user actions. The generated metadata may include, but is not limited to, the selection of the first set of operations, the selection of the first technology of the second plurality of technologies, provision of a set of execution parameters for the execution of the first set of operations, or the like. The set of execution parameters (e.g., configuration parameters) may refer to one or more parameters/parameter values provided (e.g., entered) by the user (e.g., the plurality of users) for the execution of the first set of operations. Examples of the execution parameters are provided in later figures. Further, the first plurality of user actions may include any other action performed by the user for the execution of the first set of operations. For example, the first plurality of user actions may include entry of time schedule (e.g., a start time and/or stop time) for the execution of the first set of operations. The first plurality of user actions may further include provision of one or more parameters (or parameter values) for the execution of the first set of operations. For example, if the first set of operations corresponds to data ingestion, the first plurality of user actions may include one or more user actions associated with a definition of data source from which data is to be extracted, one or more user actions associated with data transformation to be performed on the extracted data, or the like. Similarly, if the first set of operations corresponds to repository management or code commits, the first plurality of user actions may include one or more user actions associated with an entry of an identifier of a repository to which the code is to be committed.

In an exemplary scenario, the user may select a data source (e.g., comma separated values or CSV file) and a data ingestion technology (e.g., DataBricks®, Hadoop®, or the like) for developing or implementing a data pipeline for the software product. In such a scenario, the generated metadata may be indicative of the selection of the data source (e.g., CSV file) and the data ingestion technology (e.g., DataBricks®, Hadoop®, or the like) for the development of the data pipeline for the software product by the user (e.g., the plurality of users). In another exemplary scenario, the user may select a deployment mode/deployment technology (e.g., Docker®, Kubernetes®, or Terraform®) and a cloud technology (e.g., Microsoft Azure®, Amazon AWS®, or Google Cloud Platform®) for deploying the software product. In such a scenario, the generated metadata may be indicative of the selection of the cloud technology and the deployment mode (e.g., Docker®, Kubernetes®, or Terraform®) by the user for the deployment of the software product. For the sake of brevity, it is assumed that the first plurality of user actions may include the selection of the first set of operations and the first technology 114a.

The user action designer 202 stores, in the user action catalog 203, the metadata associated with the first plurality of user actions. The user action script compiler 204 may generate a first set of user action scripts based on the metadata stored in the user action catalog 203. The generated first set of user action scripts may include data, application program interfaces (APIs), code, database scripts, configuration files, or the like that correspond to the metadata. In one example, the first set of user action scripts may be indicative of defined ideas, features, and/or business requirements for documentation of the define stage 216a of the product development of the software product. In another example, the first set of user action scripts may be indicative of one or more UI design mock-ups for designing different facets of the software product. In another example, the first set of user action scripts may be indicative of the selection of a data source (e.g., a CSV file) and a data ingestion technology (e.g., Databricks®) for an implementation of the data pipeline. The first set of user action scripts may correspond to a format or a programming language (e.g., a proprietary language, an open-source language, or the like) natively supported by the service application 112.

For the sake of brevity, it is assumed that the first set of user action scripts includes a single user action script (e.g., a first user action script). However, in another embodiment, the first set of user action scripts may include multiple user action scripts. Here, the first user action script is indicative of the selection of the first technology 114a and the selection of the first set of operations to be executed by the first technology 114a.

The first user action script may include multiple sections (e.g., a plurality of sections). A first section of the first user action script may correspond to the selected first technology 114a and may be indicative of the selection of the first technology 114a and the first set of operations to be executed by the first technology 114a. The first section of the first user action script may further be indicative of a first set of execution parameters for the execution of the first set of operations.

The plurality of gentech script generators 208 include first through $n^{th}$ gentech script generators 208. Each gentech script generator, of the plurality of gentech script generators 208, may be configured to generate, scripts that are in a technology-agnostic format. For the sake of brevity, scripts that are in a technology-agnostic format are interchangeably referred to as "gentech scripts" throughout the disclosure. Gentech scripts may be generated by the plurality of gentech script generators 208 based on user action scripts (e.g., the first set of user action scripts, the first user action script, or the like) or on sections of user action scripts (e.g., the first section of the first user action script). Each gentech script generator, of the plurality of gentech script generators 208, may be associated with an operation of the first plurality of operations. In other words, each gentech script generator, of the plurality of gentech script generators 208, is configured to generate gentech scripts for technology-specific interpreters associated with technologies (e.g., the second plurality of technologies) available for execution of a corresponding set of operations (e.g., data ingestion).

For example, the first gentech script generator 208a may be associated with data ingestion (e.g., the first set of operations) and may be configured to generate gentech scripts for a plurality of technology-specific interpreters associated with the second plurality of technologies. The gentech scripts generated by the first gentech script generator 208a may be technology-agnostic (e.g., in a technology-agnostic format) with respect to the plurality of technology-specific interpreters associated with the second plurality of technologies. Therefore, each gentech script generator, of the plurality of gentech script generators 208, is configured to cater to a class of technologies (e.g., the second plurality of technologies) that are available to execute a similar or same set of operations (e.g., the first set of operations). In a non-limiting example, it is assumed that a single gentech script generator caters to all technologies (e.g., technology platforms) that are included within a corresponding class of technologies. However, in another embodiment, there may be multiple gentech script generators, each configured to cater to one or more sub-classes of technologies within the class of technologies.

The plurality of technology-specific interpreters 210 include first through $n^{th}$ technology-specific interpreters 210a-210n for the first plurality of technologies. Each of the first through $n^{th}$ technology-specific interpreters 210a-210n may be configured to generate technology-specific scripts for a corresponding technology of the first plurality of technologies 114. Each of the first through $n^{th}$ technology-specific interpreters 210a-210n may be configured to generate technology-specific scripts based on a set of gentech scripts received from a gentech script generator of the plurality of gentech script generators 208. In other words, each of the first through $n^{th}$ technology-specific interpreters 210a-210n may be configured to convert gentech scripts received from a corresponding gentech script generator to a technology-specific script that is compatible with a corresponding technology. For example, the first technology-specific interpreter 210a that is associated with the first technology 114a may be configured to convert gentech scripts received from the first gentech script generator 208a into corresponding technology-specific scripts. Similarly, the second technology-specific interpreter 210b that is associated with the second technology 114b may be configured to convert gentech scripts received from the first gentech script generator 208a into corresponding technology-specific scripts.

In the current embodiment, it is assumed that each of the first plurality of technologies 114 is associated with a technology-specific interpreter of the plurality of technology-specific interpreters 210. In other words, each technology communicates with a corresponding technology-specific interpreter of the plurality of technology-specific interpreters 210. However, in another embodiment, the architecture of the service application 112 may include a single technology-specific interpreter, in lieu of the plurality of technology-specific interpreters 210. In such a scenario, the single technology-specific interpreter (not shown) may communicate with the first plurality of technologies 114.

The user action script compiler 204 may communicate the first user action script (e.g., the first set of user action scripts) to the orchestrator 206. The orchestrator 206 may be configured to manage the plurality of gentech script generators 208 and the plurality of technology-specific interpreters 210. The orchestrator 206, based on a received user action script (e.g., the first set of user action scripts), communicates sections of the received user action script to respective gentech script generators of the plurality of gentech script generators 208. In other words, the orchestrator 206 determines which of the plurality of gentech script generators 208, receives which sections of the received user action script. The orchestrator 206 may be further configured to receive gentech scripts from the plurality of gentech script generators 208. Based on the user action script, the orchestrator 206 may communicate the received gentech scripts to respective technology-specific interpreters of the plurality of technology-specific interpreters 210. In some embodiments, the orchestrator 206 may further facilitate communication between the technology-specific interpreters of the plurality of technology-specific interpreters 210 when there is a dependency between technologies, of the first plurality of technologies 114, for executing the first set of operations.

The orchestrator 206 may store, therein, or in a memory associated therewith a look-up table (not shown). The look-up table may be indicative of a mapping between the first plurality of technologies, the plurality of gentech script generators 208, and the plurality of technology-specific interpreters 210.

The orchestrator 206 may store the first set of gentech scripts in the memory of the application server 106. The orchestrator 206 may store a mapping between the first set of gentech scripts and the first plurality of user actions in the memory of the application server 106. The orchestrator 206 may also store the first user action script associated with the first set of gentech scripts in the memory of the application server 106. The first gentech script generator 208a may communicate the first set of gentech scripts to the orchestrator 206. Based on the first user action script and the information stored in the look-up table, the orchestrator 206 may communicate the first set of gentech scripts to the first technology-specific interpreter 210a. The first technology-specific interpreter 210a may generate a first set of technology-specific scripts, based on the first set of gentech scripts.

The first set of technology-specific scripts is compatible with the first technology 114a. In other words, the first set of technology-specific scripts is specific to the first technology 114a. The first technology-specific interpreter 210a may communicate the first set of technology-specific scripts to the first technology server 104a that hosts the first technology 114a. The first technology server 104a may execute the first set of technology-specific scripts received from the first technology-specific interpreter 210a, thereby, executing the first set of operations.

In another embodiment, the orchestrator 206 may communicate the first set of gentech scripts to the user action designer 202 for display to the user (e.g., the plurality of users). The orchestrator 206 may communicate the first set of gentech scripts to the user action designer 202 if one or more scripts of the first set of gentech scripts correspond to a programming language (e.g., a high-level open program language such as Python, Scala, Spark, Java, or the like). Consequently, the user action designer 202 may display the first set of gentech scripts on the UI for modification by the user. One or more scripts of the first set of gentech scripts may be modified by the user. In other words, the first set of gentech scripts may be partially or completely modified by the user. The modified first set of gentech scripts may be communicated by the user action designer 202 to the orchestrator 206. The orchestrator 206 may communicate the modified first set of gentech scripts to the first technology-specific interpreter 210a. In such a scenario, the conversion, by the first technology-specific interpreter 210a, of the first set of gentech scripts includes conversion of the one or more modified scripts of the first set of gentech scripts. A remaining process for the execution of the first set of operations remains the same. The orchestrator 206 stores, in the memory of the application server 106, a mapping between the first plurality of actions and the modified first set of gentech scripts.

FIG. 3 is explained in conjunction in FIG. 2. For the sake of brevity, it is assumed that the execution of the first set of operations by the first technology 114a is in progress or complete.

Referring now to FIG. 3, based on the execution (e.g., the initiation of the execution) of the first set of operations by the first technology 114a, the first technology server 104a may communicate first progress data to the first technology-specific interpreter 210a. The first progress data may include, but is not limited to, data indicative of a level of completion of execution (e.g., progress of execution) of the first set of operations and/or one or more outputs of the execution of the first set of operations. The first progress data may further include a set of logs generated by the first technology 114a during the execution of the first set of operations, a set of alerts generated by the first technology 114a during the execution of the first set of operations, and/or a set of errors generated by the first technology 114a during the execution of the first set of operations. The first progress data may be received, by the first technology-specific interpreter 210a, in a format (e.g., technology-specific scripts) that is specific to the first technology 114a.

The first through $n^{th}$ technology-specific interpreters 210a-210n may be further configured to generate gentech scripts based on progress data received from corresponding technologies or technology servers that host the corresponding technologies. In other words, the first through $n^{th}$ technology-specific interpreters 210a-210n are configured to convert the progress data into the gentech scripts. In the current embodiment, the first technology-specific interpreter 210a may generate a second set of gentech scripts based on the first progress data from the first technology server 104a (e.g., the first technology 114a). Consequently, the first technology-specific interpreter 210a may communicate the second set of gentech scripts to the orchestrator 206. Based on the reception of the second set of gentech scripts from the first technology-specific interpreter 210a and the information stored in the look-up table, the orchestrator 206 may determine that the first gentech script generator 208a is mapped to the first technology-specific interpreter 210a. In other words, the orchestrator 206 identifies that the first gentech script generator 208a is mapped to the first technology-specific interpreter 210a.

Based on the determination or identification that the first gentech script generator 208a is mapped to the first technology-specific interpreter 210a, the orchestrator 206 may communicate the second set of gentech scripts to the first gentech script generator 208a.

Each of the plurality of gentech script generators 208 may be further configured to generate user action scripts based on gentech scripts received from the plurality of technology-specific interpreters 210. In other words, each of the plurality of gentech script generators 208 may be further configured to convert the received gentech scripts into user action scripts. Based on the received second set of gentech scripts, the first gentech script generator 208a may generate a second set of user action scripts. The second set of user action scripts is indicative of the first progress data received from the first technology 114a. The first gentech script generator 208a may communicate the second user action script to the orchestrator 206. The orchestrator 206 may communicate the second user action script to the response converter 212.

The response converter 212 may include suitable logic, circuitry, interfaces and/or code, executable by the circuitry, that may be configured to receive the second user action script from the orchestrator 206, and generate, based on the second user action script, a first set of user action responses. The first set of user action responses may include metadata indicative of the first progress data. The user action designer 202 may receive the first set of user action response. Based on the first set of user action responses, the user action designer 202 may generate a first set of visual indicators and present the first set of visual indicators on the UI rendered on the first user device 102a. The first set of visual indicators may include, but is not limited to, text, numbers, or diagrams (e.g., diagrammatic elements) indicative of the first progress data. For example, the first set of visual indicators may include the generated set of documents or a link to the generated set of documents, alert messages (e.g., text) or logs (e.g., text) indicative of the progress of the execution of the first set of operations. Similarly, the first set of visual indicators may further include the level of completion (e.g., numbers) of the execution of the first set of operations. Similarly, the first set of visual indicators may further include diagrammatic representations (e.g., graphs, charts, scatter plots, tables, or the like) indicative of the first progress data. Operations of the activity tracker 214 have been described with respect to FIG. 4.

Referring back to FIG. 4, the activity tracker 214 includes an activity watcher 404 that monitors the various stages (e.g., the plurality of stages 216) of the development of the software product. The activity watcher 404 may be configured to track and monitor user input and actions performed using the service application 112 at each stage (e.g., the define stage 216a, the design stage 216b, the development stage 216c, and deployment stage 216d) of the plurality of stages 216. In other words, the activity watcher 404 is configured to track a plurality of activities executed during the plurality of stages 216 of the development of the software product.

The plurality of activities may include first through fourth sets of activities executed during the define stage 216a, the design stage 216b, the development stage 216c, and deployment stage 216d, respectively. For example, the first set of activities may include activities executed during the define stage 216a. Similarly, the second set of activities may include activities executed during the design stage 216b. The third set of activities may include activities executed during the development stage 216c. The fourth set of activities may include activities executed during the deployment stage 216d.

The tracked plurality of activities may include actions (e.g., user actions) performed by the plurality of users on the UI rendered by the user action designer 202. The tracked plurality of activities may further include operations executed by technologies (e.g., the first technology 114a) selected for the implementation of the plurality of stages 216. For example, the tracked plurality of activities may include user actions performed on the UI of the service application 112 for creation of a set of business requirements and a document for each of the set of business requirements. The tracked plurality of activities may further include selection of a technology (e.g., a first documentation technology), of the first plurality of technologies 114, for documentation/creation of the first plurality of the document for each of the set of business requirements. Further, the tracked plurality of activities may include execution of a set of operations (e.g., document creation operations) by the first documentation technology for the creation of the set of business requirements and corresponding documents.

Examples of the first documentation technology may include, but are not limited to, Confluence, Google Docs, or the like. The execution of the set of operations (e.g., the document creation operations) by the first documentation technology may be tracked by way of progress data received from the first documentation technology.

For example, the activity watcher 404 may track a progress of execution of the set of operations by the first documentation technology by way of a set of user action responses that is generated by the response converter 212 and indicative of the progress of execution of the set of operations. Alternatively, the activity watcher 404 may track the progress of execution of the set of operations by the first documentation technology by way of a set of visual indicators generated by the user action designer 202 and indicative of the progress of execution of the set of operations.

In one embodiment, the tracked first set of activities in the define stage 216a may further include definition of an approval workflow (e.g., a set of approval workflows) for each of the set of business requirements and the corresponding documents. The approval work flow for each business requirement may be indicative of a set of users (e.g., user IDs of the set of users), of the plurality of users, authorized to approve each of the set of business requirements. In such a scenario, the tracked first set of activities in the define stage 216a may further include an approval or a rejection of each of the set of business requirements or the documents (e.g., business documents), a user ID of each user who approves or rejects each business requirement or document, a time-period associated with the approval or rejection of each business requirement/document (e.g., time taken to approve or reject), or the like.

Similarly, the tracked first set of activities may include user actions performed on the UI for creation of a set of stories (e.g., agile stories or agile epics) associated with each business requirement of the set of business requirements. The tracked first set of activities may include selection of a technology (e.g., a first project management technology), of the first plurality of technologies 114, for the creation of the set of stories for each of the set of business requirements. Further, the tracked first set of activities may include execution of a set of operations (e.g., project management operations) by the first project management technology for the creation of the set of stories for each of the set of business requirements.

Examples of the first project management technology may include, but are not limited to, Jira, Trello, Asana, the like. The execution of the set of operations (e.g., document creation operations) by the first project management technology may be tracked by way of progress data received from the first project management technology. Tracking of a progress of execution of the set of operations by the first project management technology may be similar to the tracking of the set of operations by the first documentation technology.

In the design stage 216b, the tracked second set of activities may include user actions performed on the UI for creation or input of a set of architecture documents (e.g., UI design mockups, UX mockups, technical architecture documents, or the like) for each of the set of stories. The tracked second set of activities may further include updating of one or more of the set of architecture documents, creation of a set of approval workflows for the set of architecture documents, or the like. The tracked second set of activities may include selection of a technology (e.g., a first design technology), of the first plurality of technologies 114, for the creation of the set of architecture documents for each of the set of business requirements. Further, the tracked plurality of activities may include execution of a set of operations (e.g., design creation operations) by the first design technology for the creation of the set of architecture documents for each of the set of business requirements. Examples of the first design technology may include, but are not limited to, Confluence, Figma, or the like. Tracking of a progress of execution of the set of operations by the first design technology may be similar to the tracking of operations executed by the first documentation technology.

In the development stage 216c, the tracked third set of activities may include user actions performed on the UI for selection of a technology stack for the development of the software product. For example, the selected technology stack may include a frontend technology (e.g., React) for implementation of frontend framework for the software product, a backend technology for implementation of a backend framework (e.g., Java) for the software product, and a database technology (e.g., MongoDB) for implementation of a database for the software product. The tracked plurality of activities may further include creation of a set of code repositories at one or more version control technologies of the first plurality of technologies 114. Examples of the one or more version control technologies may include, but are not limited to, GitHub, GitLab, or the like. The tracked third set of activities may further include selection and/or usage of a set of code editors for writing code for the selected technology stack, creation of a set of approval workflows for the selected technology stack, or the like.

The third set of activities may further include editor engagement of each user (e.g., of the plurality of users) for each of the selected set of code editors. The editor engagement for each of the selected set of code editors may include or may be indicative of a frequency of usage of a corresponding code editor by a user, a time duration spent by the user on the corresponding editor, a count of lines of code written by the corresponding use, or the like. For example, the tracked third set of activities may indicate that a first user, of the plurality of users, has spent "17" hours on a first code editor (e.g., Eclipse) writing Java code and has committed code three times to a corresponding code repository. Similarly, the tracked third set of activities may indicate that a second user, of the plurality of users, has spent "27" hours on a second code editor writing "React" code and has committed code once to a corresponding code repository.

In the deployment stage 216d, the tracked fourth set of activities may include user actions performed on the UI for the deployment of the software product. In a non-limiting example, the software product may correspond to (e.g., conform) to a microservice architecture. In such a scenario, the software product may include a plurality of microservices (e.g., Java, React, or the like). The tracked fourth set of activities may include user actions performed by the user on the UI for the deployment of each of the plurality of microservices. For example, the fourth set of activities may include user actions performed on the UI for configuration of a plurality of cloud instances (e.g., cloud infrastructure or a set of virtual machines) for the deployment of the plurality of microservices. A first set of configuration details may be inputted by a user for the deployment of a first microservice (e.g., React), of the plurality of microservices.

The first set of configuration details may be indicative of a deployment mode of a plurality of deployment modes (e.g., Kubernetes, OpenShift, Terraform, or the like) available for the deployment of the first microservice. The first set of configuration details may further be indicative of a first cloud technology (e.g., Azure, AWS, GCP, or the like), of the first plurality of technologies 114, for the deployment of the first microservice. The first set of configuration details may be further indicative of a first machine configuration (e.g., 2 Gigabyte RAM and 2vCPU) for a first virtual machine (VM) to be used for the deployment of the first microservice. In other words, the first set of configuration details may be indicative of a first set of configuration parameters for the provisioning of the first cloud instance at the first cloud technology for the deployment of the first microservice. Similarly, a second set of configuration details may be inputted by the user for the deployment of a second microservice (e.g., Java) of the plurality of microservices. Therefore, the fourth set of activities may include the input of the set of configuration details for the deployment of each of the plurality of microservices.

The fourth set of activities may further include actions performed by the user on the UI for creation (e.g., configuration, design, or definition) of a plurality of CI/CD pipelines for the plurality of microservices. The plurality of CI/CD pipelines may include a set of CI/CD pipelines for each of the plurality of microservices. The fourth set of activities may further include actions performed (e.g., by the user) for triggering the plurality of CI/CD pipelines. The fourth set of activities may further include operations (e.g., CI/CD operations, testing operations, security scan operations, or the like) executed by a CI/CD automation technology for the deployment of each of the plurality of microservices. Examples of the CI/CD automation technology may include, but are not limited to, Jenkins, CircleCI, Bamboo, or the like.

The fourth set of activities may further include actions performed by the user on the UI for configuration (e.g., design, definition, or creation) of a plurality of development environments (e.g., the development environment, the QA environment, the product environment, or the like) for the deployment of the plurality of microservices. The fourth set of activities may further include operations performed (e.g., by a cloud technology such as AWS or Azure) for the deployment of each of the plurality of microservices.

The activity watcher 404 may further track a user or a team (e.g., a development team, a release team, a business unit, or the like) that is responsible for a corresponding activity. In other words, the activity watcher 404 may link each tracked activity, of the first through fourth sets of activities, to a ID of a user or a team associated with the activity.

Therefore, the activity watcher 404 may be triggered to monitor usage of the service application 112 whenever a user (e.g., the plurality of users) accesses the service application 112. In another embodiment, the activity watcher 404 may continuously monitor the user action designer 202 or the user action catalog 203 for user input or user action. Further, the activity watcher 404 may also monitor operations (e.g., code commit, build, testing, modification, deletion, or the like) associated with the plurality of stages 216 of the product development of the software product.

The activity watcher 404 may generate a plurality activity logs based on the tracking of the plurality of activities. In a non-limiting example, the activity watcher 404 may generate an activity log for each of the tracked plurality of activities. In other words, each of the plurality of activity logs is associated with an activity of the tracked plurality of activities. Therefore, the activity watcher 404 may generate first through fourth sets of activity logs that correspond to the tracked first through fourth sets of activities, respectively. Each activity log may include, therein, information that completely describes a corresponding activity. For example, a first activity log of the first set of activity logs may be indicative of (e.g., include information associated with) the user actions performed on the UI for creation of a first business requirement of the set of business requirements. The first activity log may be indicative of a user identifier (ID) of a user who performed corresponding user actions for the creation of the first business requirement. The first activity log may include a timestamp indicative of a time-instance at which the user actions are performed by the first user on the UI rendered by the user action designer 202.

Similarly, a second activity log of the plurality of activity logs may be indicative of the set of operations performed by the first documentation technology for the creation of a first document for the first business requirement. The second log may be indicative of a progress of execution of the set of operations by the first documentation technology, and may include a timestamp indicative of a time-instance at which the set of operations is executed by the first documentation technology. Similarly, in a non-limiting example, a third activity log may be indicative of a set of user actions performed by a second user to approve the created first business requirement. The third activity log may be indicative of the approval of the first business requirement by a second user. The third activity log may include a user ID of the second user and a timestamp indicative of a time-instance at which the first business requirement and/or the first document is approved by the second user.

The second through fourth sets of activity logs and remaining activity logs of the first set of activity logs may be generated in a similar manner. It will be apparent to those of skill in the art that aforementioned activity logs (e.g., the first through third activity logs) are merely exemplary and do not limit the scope of the disclosure.

The activity watcher 404 may communicate the generated plurality of activity logs to the activity filter 406. In other words, the activity filter 406 may receive the first through fourth sets of activity logs, which are associated with the first through fourth sets of activities, from the activity watcher 404. The activity filter 406 may process or analyze each of the plurality of activity logs (e.g., the first through fourth sets of activity logs). Each of the plurality of activity logs may be indicative of a corresponding activity executed in one of the plurality of stages 216. Examples of the corresponding activity may include, but are not limited to, creation of the set of business requirements, creation of the set of documents for each of the set of business requirements, approval/rejection of each of the set of business requirements, writing of code for the selected technology stack, deployment of each of the plurality of microservices, provisioning of cloud infrastructure for each of the plurality of microservices, or the like.

Based on the analysis of each of the plurality of activity logs, the activity watcher 404 may determine (e.g., identify) the activity indicated by a corresponding activity log, and, thereby, tag a corresponding activity log with one of a first plurality of tags. The first plurality of tags may include first through fourth tags that correspond to the define stage 216a, the design stage 216b, the development stage 216c, and the deployment stage 216d, respectively. For example, based on the determination that the activity indicated by each of the first through third activity logs corresponds to the define stage 216a, the activity filter 406 may tag each of the first through third activity logs with the first tag that corresponds to the define stage 216a. The first set of activity logs that is associated with the first set of activities is tagged with the first tag that corresponds to the define stage 216a. Similarly, the activity filter 406 may tag the second set of activity logs with the second tag that corresponds to the design stage 216b, the third set of activity logs with the third tag that corresponds to the development stage 216c, and the fourth set of activity logs with the fourth tag that corresponds to the deployment stage 216d.

The tag for each of the plurality of activity logs is indicative of an association between a corresponding activity log and a corresponding stage of the plurality of stages 216. For example, the first tag for the first activity log indicates that the first activity log is associated with the define stage 216a. Similarly, the second tag for an activity log, of the plurality of activity logs, indicates that the activity log is associated with the design stage 216b. Similarly, the third tag for an activity log, of the plurality of activity logs, indicates that the activity log is associated with the development stage 216c. The fourth tag for an activity log, of the plurality of activity logs, indicates that the activity log is associated with the deployment stage 216d.

Each activity log may include an ID (e.g., user ID, team ID, or the like) of a user or a team associated with a corresponding activity. In other words, each activity log may include an ID of a user or a team responsible for initiation of a corresponding activity. Each activity log may further include or may be indicative of a time duration/time period taken for execution of a corresponding activity. For example, the first activity log may be indicative of the time duration taken (e.g., time taken) by the first user for the creation of the set of business requirements and the corresponding documents. An activity log of the second set of activity logs may be indicative of a time taken for creation of the set of architecture documents. Similarly, an activity log of the second set of activity logs may be indicative of the time duration taken to access or open a first code editor for writing code for the first microservice (e.g., React). Another activity log of the third set of activity logs may be indicative of the time duration taken by a user, of the plurality of users, to write code in the first code editor. Similarly, an activity log of the fourth set of activity logs may be indicative a time duration taken by a user for entry of the first set of configuration details for the configuration of the first cloud instance for the deployment of the first microservice. Similarly, an activity log of the fourth set of activity logs may be indicative of a time duration taken for the first CI/CD automation technology run a first CI/CD pipeline for the deployment of the first microservice in the first cloud instance.

The activity filter 406 may further map each activity log, of the first through fourth sets of activity logs, to one of a plurality of releases of the software product. The mapping of the plurality of activity logs to the plurality of releases may be based on a release dependency graph received by the activity filter 406. The release dependency graph (not shown) may be indicative of the plurality of releases. The release dependency graph may further be indicative of a mapping between the plurality of releases and the set of business requirements. Therefore, based on the release dependency graph, the activity filter 406 may map each of the tagged plurality of activity logs to at least one of the plurality of releases. Each of the tagged plurality of activity logs may be updated, by the activity filter 406, to indicate a corresponding mapped release. In other words, each of the tagged plurality of activity logs may, based on the mapping, be indicative of a release ID of a release that is mapped to a corresponding activity/activity log.

The activity filter 406 may communicate the tagged plurality of activities (e.g., the tagged first through fourth sets of activities) to the value stream engine 408.

Based on the reception of the tagged plurality of activities, the value stream engine 408 may classify each of the plurality of activities as one of a value-added activity or non-value added activity. The classification of each of the plurality of activities may be based on a predetermined set of rules. The set of rules may indicate which of the plurality of activities are to be classified as value-added activities and which of the plurality of activities are to be classified as non-value added activities. The set of rules may include a rule for each of the plurality of activities, indicating whether a corresponding activity is to be classified as a value-added activity or a non-value added activity.

In a non-limiting example, the set of rules may indicate that creation of documents for the set of business requirements is to be classified as a value-added activity. Similarly, the set of rules may indicate that feedback incorporation following rejection of any of the created documents is to be classified as a value-added activity. The set of rules may further indicate that any activity (and time) associated with coding, using the selected technology stack, is a value-added activity.

The set of rules may indicate that any activity (and time) associated with waiting for approval (e.g., approval of documents for the set of business requirements, approval of code written by users, or the like) may be classified as non-value added activity. Similarly, the set of rules may indicate that a time taken for creation of code repositories for the selected technology stack is to be classified as non-value added time. The set of rules may further indicate that that a time taken for a CI/CD pipeline to execute may be classified as non-value added time. It will be apparent to those of skill in the art that aforementioned rules are merely exemplary and are not meant to limit the scope of the disclosure. In an actual implementation, the set of rules may include additional rules/different rules for the classification of the plurality of activities without deviating from the scope of the disclosure.

Further, the value stream engine 408 may be configured to generate a value stream map 410 for development of the software product. The value stream map 410 may be indicative of end-to-end (e.g., from ideation to deployment) process visibility for the development of the software product. For each stage (e.g., the define stage 216*a*, the design stage 216*b*, the development stage 216*c*, or the deployment stage 216*d*) of the plurality of stages 216, the value stream map 410 may be indicative of a lead time for completion of a corresponding stage. The value stream map 410 may be further indicative of time spent waiting (e.g., waiting for approvals) at each stage. Creation of the value stream map 410 may involve automated collection of data from various sources (e.g., the plurality of user devices 102, the application server 106, or the like) and creation of a unified data model for analysis of the data collected from the various sources. For each stage, the value stream map 410 may indicate key-performance indicators (e.g., bottlenecks, wasted time, wasteful activities, or the like). The value stream map 410 may enable definition of customized metrics. Consequently, the value stream map 410 may include values and/or trends for these of customized metrics. The value stream map 410 may include data that corresponds to each stage of the plurality of stages 216 at a workstream level, release level (based on data corresponding to all workstreams in a single release), and/or a product level (based on data corresponding to all releases and corresponding workstreams).

The value stream map 410 may be further indicative of efficiency of the plurality of users at the plurality of stages 216 of the product development of the software product. In an embodiment, the value stream map 410 may enable each user, of the plurality of users, to view a corresponding productivity report and receive suggestions to improve their productivity. The value stream map 410 significantly eliminates requirement of manual logging of activities performed by the plurality of users during the product development of the software product.

The activity filter 406 may communicate the tagged plurality of activities (e.g., the tagged first through fourth sets of activities) to the relationship mapper 412. The relationship mapper 412 may be configured to map each activity performed by the plurality of users with corresponding cause(s) as well as immediate and delayed effect(s). The relationship mapper 412 may, based on a relationship matrix (not shown) stored in the memory of the service application 112, correlate the first through fourth sets of activities indicated by the first through fourth sets of logs. The relationship matrix may be indicative of a correlation between the first through fourth sets of activities. For example, the relationship matrix may indicate that the first activity (e.g., the user actions performed on the UI for the creation of the set of business requirements) is correlated with the second activity (e.g., the set of operations performed by the first documentation technology). Similarly, the relationship matrix may indicate that the writing of code (e.g., one of the third sets of activities) for the first microservice (e.g., React) is correlated with an approval provided by a user (e.g., of the plurality of users) for the deployment of the first microservice. Similarly, the relationship matrix may indicate that the writing of code (e.g., one of the third sets of activities) for the first microservice (e.g., React) is correlated to an activity performed (e.g., by a CI/CD auto-mation technology) to commit the code to a code repository. Similarly, the relationship matrix may indicate that one of the plurality of releases is correlated with provisioning of a set of VMs at one or more cloud technologies for the deployment of the first microservice (e.g., one of the fourth sets of activities). Similarly, the relationship matrix may indicate that the selection of the technology stack for the development of the software product is correlated with creation of a set of CI/CD pipelines each of the plurality of microservices (e.g., one of the fourth sets of activities).

The relationship mapper 412 may be configured to generate a graph that includes a plurality of nodes. Each of the plurality of nodes corresponds to an activity of the first through fourth sets of activities. The relationship mapper 412 may generate, based on the relationship matrix (e.g., based on the correlation of the first through fourth sets of activities) a plurality of edges between the plurality of nodes. An edge between any two nodes of the plurality of nodes is indicative of a causal relationship (e.g., a correlation) between activities that correspond to the two nodes. For example, the graph may include an edge between two nodes that represent the first activity and the second activity, respectively. Similarly, the graph may include an edge between a node that is indicative of the writing of code for the first microservice and another node that is indicative of the approval provided for the plurality of first microservice.

The graph that includes the plurality of edges and the plurality of nodes is referred to as a traceability map (hereinafter, designated and referred to as the "traceability map 414"). In other words, the traceability map 414 corresponds to a combination of the plurality of edges and the plurality of nodes. The traceability map 414 is indicative of a causal relationship (e.g., the correlation) between the first through fourth sets of activities.

The relationship mapper 412 may be configured to map each activity performed by the plurality of users with corresponding cause(s) as well as immediate and delayed effect(s) on the software product. Based on the mapping of the activities of the plurality of users with corresponding cause(s) as well as immediate and delayed effect(s), the relationship mapper 412 may generate a relationship matrix that represents causal and/or consequential relationship between activities, operations, and effects. The traceability map 414 may provide the plurality of users with a capability to trace each operation (e.g., creation, initiation, modification, deletion, or the like) that has been performed during the plurality of stages 216 associated with the product development of the software product. The traceability map 414 may be configured to perform a mapping among the product, releases or versions of the software product, workstreams associated with the software product, requirements, designs, artifacts, user feedback, code commits, pipelines, test cases, or the like. The traceability map 414 further provides a visual representation of one or more issues associated with the software product to one or more versions or changes in the software product that may have resulted in any issue. In a non-limiting example, the traceability map 414 may indicate that a change in the deployment pipeline for the software product may have caused deployment infrastructure (e.g., a VM) to crash frequently. Therefore, the traceability map 414 allows for a seamless detection and analysis of bugs, errors, and issues associated with the product in significantly less time.

Therefore, the service application 112 (e.g., the activity tracker 214) enables analysis of a value stream (e.g., the first through fourth sets of activities) to determine the value stream map 410 and the traceability map 414.

The service application 112 further allows for orchestration at the plurality of stages 216 (e.g., the define stage 216a, the design stage 216b, the development stage 216c, and the deployment stage 216d). Orchestration at the various stages of the SDLC of the software product allows for automated configuration, integration, deployment, and management of the software product. Such orchestration of the software product is facilitated by a product orchestration designer 402 of the service application 112.

The product orchestration designer 402 may be configured to execute one or more instructions for automated configuration, integration, deployment, and management of the software product. The product orchestration designer 402 facilitates one or more interfaces for automating and orchestrating various stages and sub-stages of the SDLC of the software product. In an embodiment, the product orchestration designer 402 provides one or more tools for defining and configuring the various stages of the SDLC of the software product.

In an embodiment, the product orchestration designer 402 enables release orchestration of one or more software products or one or more features of a single software product (e.g., the software product). The product orchestration designer 402 enables coordination of all activities involved at various stages in the SDLC of the software product in a pipeline that facilitates various releases of the software product. The product orchestration designer 402 enables tracking of the development of the software product in regard to a timeline for release (e.g., release timeline) associated with the software product. Moreover, the product orchestration designer 402 ensures maintenance of a log of various commits, milestones, issues, or the like associated with the software product. In an embodiment, such logs may be used for generation of the value stream map 410 and/or the traceability map 214.

In an embodiment, the product orchestration designer 402 may facilitate release orchestration associated with a plurality of releases associated with the software product and/or other software products. The product orchestration designer 402 may further provide one or more tools for configuring the plurality of releases. The product orchestration designer 402 may provide a release orchestration view (e.g., a release train) associated with the plurality of releases. Further, the product orchestration designer 402 may provide a single pane view of a release calendar of the plurality of releases associated with the software product and/or other software products. The release calendar may include a timeline and corresponding progress or milestone for each release and corresponding workstreams. The single pane view allows the plurality of users to monitor, observe, and co-ordinate progress associated with the plurality of releases using only the service application 112. This enables the plurality of users to maintain a suitable progress across all the releases associated with the software product. Further, the product orchestration designer 402 may provide a release dependency view (e.g., release dependency map) of the plurality of releases associated with the software product. The release dependency view of the plurality of releases provides a representation of dependencies among the plurality of releases within the software product or within different software products in a product portfolio of the organization. The release dependency view may also enable addition or definition of a type of dependency and/or an extent of dependency between any two releases of the plurality of releases. In a non-limiting example, a type of dependency between first and second releases, of the plurality of releases of the software product, may be one of low, moderate, or high. A type of dependency of the second release on the first release may affect (e.g., cause delays) its timeline. For example, a delay in the first release may delay the second release, since the second release is dependent on the first release.

The product orchestration designer 402 includes a product portfolio manager 418, a release train tracker 420, a release dependency tracker 422, and a maturity assessment engine 424. The product portfolio manager 418 facilitates automated configuration, coordination, and management of a product portfolio of the organization. The product portfolio of the organization may refer to a collection of one or more products and/or services provided by the organization to target users/clients. The product portfolio may include each software product and/or service that the organisation has launched during a tenure of its operation. The product portfolio manager 418 may enable management of individual products, product lines, as well as portfolios of products. Such management of the product portfolio may help the organization attain its overall business objectives and plan future operations (regarding development, launch, halt, update or the like of software products) associated with the organization. In an embodiment, the product portfolio manager 418 may be configured to organize the products of the organization based on a domain associated with each product. For example, one or more products pertaining to a video game application may be included in a category of products associated with gaming domain. In another embodiment, the product portfolio manager 418 may be configured to organize the software products of the organization based on target users/market associated with the software products. For example, one or more products pertaining to stock market applications may be included in a category associated with corresponding target users "business men", "Stock brokers", "stock market experts", or the like. Beneficially, the product portfolio manager 418 allows for a single pane view of each product and/or services provided by the organization. Therefore, the product portfolio manager 418 provides an estimate of organization's involvement in different domains and with different types of target users/clients.

The release train tracker 420 may be configured to monitor and maintain a track of one or more releases associated with one or more software products, features associated with each software product, or the like. The release train tracker 420 may maintain a release timeline of the one or more releases that may have to be performed by the organisation during a first time-interval (e.g., one month, two months, six months, a year, or the like). The release train tracker 420 may provide the release timeline based on product timeline of the one or more products or one or more features associated with the one or more products. Further, the release train tracker 420 may provide a summary of releases that the organization may have planned for a threshold time-interval.

The release dependency tracker 422 may be configured to track dependency among a plurality of releases associated with the one or more software products or one or more features of each of the one or more software products. In a non-limiting example, release dependency among two or more releases may be one of low, medium, or high. In an embodiment, the software product may have a first release and a second release. In an example, the first release and the second release may be associated with different features of the software product and may be independent of each other. In such an example, release dependency between the first release and the second release may be low. In another example, the first and second releases may be associated with two interdependent features of the software product. In such an example, the release dependency between the first and second releases may be high. In another example, the first release may be associated with a feature of the software product and the second release may be associated with a maintenance/fix/patch associated with the feature of the first release. In such an example, the release dependency between the first and second releases may be medium. Beneficially, the release dependency tracker 422 allows the plurality of users to maintain an optimal pace of progress while working towards the plurality of releases associated with the one or more products or one or more features of the one or more software products.

The maturity assessment engine 424 may be configured to assess a current state of a development of the software product against a set of benchmarks to determine a readiness of a feature or the software product for productization (to be used in real-time environment). The maturity assessment model may assess each feature or product against the set of benchmarks established by a maturity model (e.g., a capability maturity model or CMM). The maturity assessment engine 424 may enable for planning, engineering, and management of the software product. Further, the maturity assessment engine 424 may enable the plurality of users to assess, further develop, and improve the software product.

Figure 5:
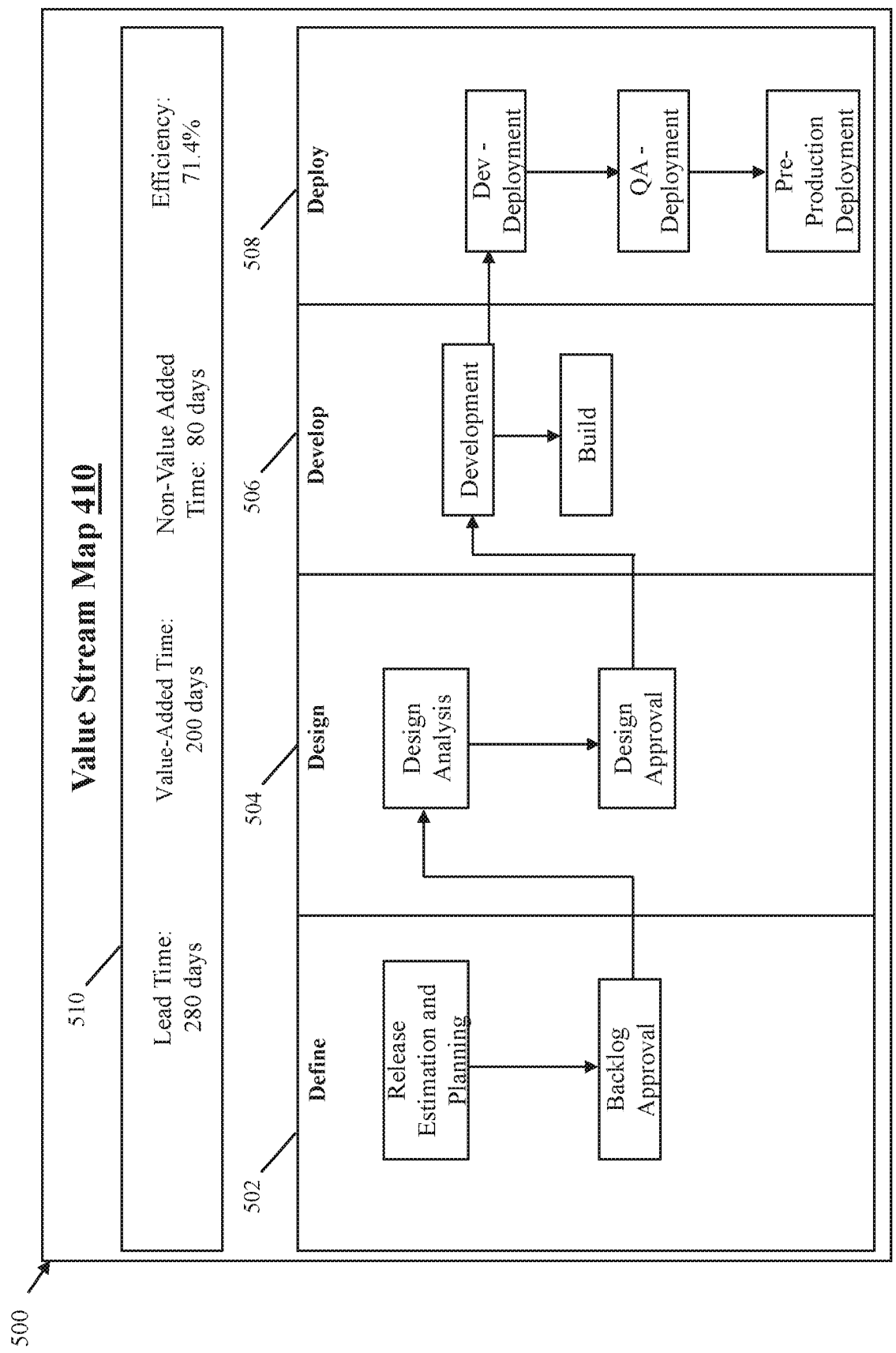
FIG. 5 is a diagram that illustrates a value stream map of FIG. 4, in accordance with an exemplary embodiment of the present disclosure.

FIG. 5 is a diagram 500 that illustrates the value stream map 410, in accordance with an exemplary embodiment of the present disclosure. FIG. 5 is explained in conjunction with FIGS. 2, 3, and 4. As described in the foregoing description of FIG. 4, the activity watcher 404 monitors the plurality of stages 216. In other words, the activity watcher 404 may track and/or monitor activities (e.g., the first plurality of actions/activities) performed at each of the plurality of stages 216. For example, the activity watcher 404 may track the first plurality of actions performed by the user in the define stage 216a for the definition of the new business requirement (as described in the foregoing descriptions of FIG. 4). Similarly, the activity watcher 404 may track the first plurality of actions performed by the user to create the designs and/or the design mockups in the design stage 216b (as described in the foregoing descriptions of FIG. 4). Similarly, the activity watcher 404 may track the first plurality of actions performed by the user to create the data pipeline in the development stage 216c (as described in the foregoing descriptions of FIG. 4). Similarly, the activity watcher 404 may track the first plurality of actions performed by the user to for the deployment of the plurality of microservices in the deployment stage 216d (as described in the foregoing descriptions of FIG. 4).

Further, the activity watcher 404 may record progress data (e.g., the first progress data received from the first technology 114a) from a selected technology or technologies (e.g., the first documentation technology, the first design technology, the first data ingestion technology, or the like) in each of the plurality of stages 216. The activity watcher 404 may further record an output (e.g., the output of the first technology 114a based on the execution of the first set of operations) from the selected technology or technologies in each of the plurality of stages 216. The activity filter 406 classifies each of the tracked plurality of user actions (in each of the plurality of stages 216) as one of the value-added activity and a non-value added activity, based on a corresponding recorded progress data and a corresponding recorded output. Consequently, the value stream engine 408 determines, based on the classification of each of the tracked plurality of user actions (in each of the plurality of stages 216), the corresponding recorded progress data, and the corresponding recorded output generates the value stream map 410. The value stream map 410 may include an efficiency score indicative of efficiency of the plurality of users at the plurality of stages 216. The efficiency score for any stage, of the plurality of stages 216, may be defined as a ratio between a total time duration of all value-added activities executed (e.g., performed) in a corresponding stage and a total time duration of all value-added activities and non-value added activities executed in the corresponding stage. For example, if a first total time duration of all value-added activities executed during the define stage 216a is "20" hours and a second total time duration of all non-value added activities executed during the define stage 216a is "5" hours, the efficiency score for the define stage is "0.8" (e.g., the first total time duration/a sum of the first and second total time durations; "20/(20+5)").

Similarly, an efficiency score for a release may be define as a total time duration of all value-added activities executed (e.g., performed) in the plurality of stages 216 for the release and a total time duration of all value-added activities and non-value added activities executed in the plurality of stages 216 for the release. It will be apparent to those of skill in the art that an efficiency score for each user may be determined or derived in a similar manner. Similarly, an efficiency score for each release of the software product may be determined or derived. The value stream map 410 may be indicative of the efficiency score for each of the plurality of releases of the software product.

The value stream map 410 may also include or be indicative of time leakages (or leakage time) at each of the plurality of stages 216. Time leakage may refer to a time duration (e.g., time period) of non-value added activity that occurs due to failure of one or more technologies of the first plurality of technologies 114. For example, a failure of the first code editor may prevent the user from writing code for the first microservice. A downtime or a time duration associated with the failure of the first code editor may be referred to as time leakage or leakage time.

The value stream map 410 may further be indicative of an efficiency of an execution of each of the plurality of stages 216 for the software product.

As shown in FIG. 5, the value stream map 410 includes first through fourth sections 502-510 that correspond to the define stage 216a, the design stage 216b, the development stage 216c, and the deployment stage 216d, respectively. Each of the first through fourth sections 502-508 is indicative of activities (e.g., user actions) performed or executed in a corresponding stage (of the plurality of stages 216). For example, the first section 502 indicates that "Release estimation and planning" and "Backlog approval" were activities performed and tracked in the define stage 216a. Similarly, the second section 504 indicates that "Design Analysis" and "Design Approval" were activities performed and tracked in the design stage 216b. Similarly, the third section 506 indicates that "Development" and "Build" were activities performed and tracked in the development stage 216c. Similarly, the fourth section 508 indicates that "DEV-Deployment" (e.g., the first deployment stage), "QA-Deployment" (e.g., the second deployment stage), and "Pre-Production Deployment" (e.g., the third deployment stage) were activities performed and tracked in the deployment stage 216d.

The value stream map 410 further includes a fifth section 510 that is indicative of a determined lead time (e.g., "280" days), a determined value-added time (e.g., "200" days), a determined non-value added time ("80 days"), and an efficiency score (e.g., "71.4%") determined by the value stream engine 408 across the plurality of stages 216 of the SDLC of the software product. In an example, the efficiency score may be determined based on a ratio of the determined value-added time (e.g., "200" days) and the determined lead time (e.g., "280" days). The efficiency score may be indicative of a percentage of the determined lead time being spent as value-added time.

Figure 6:
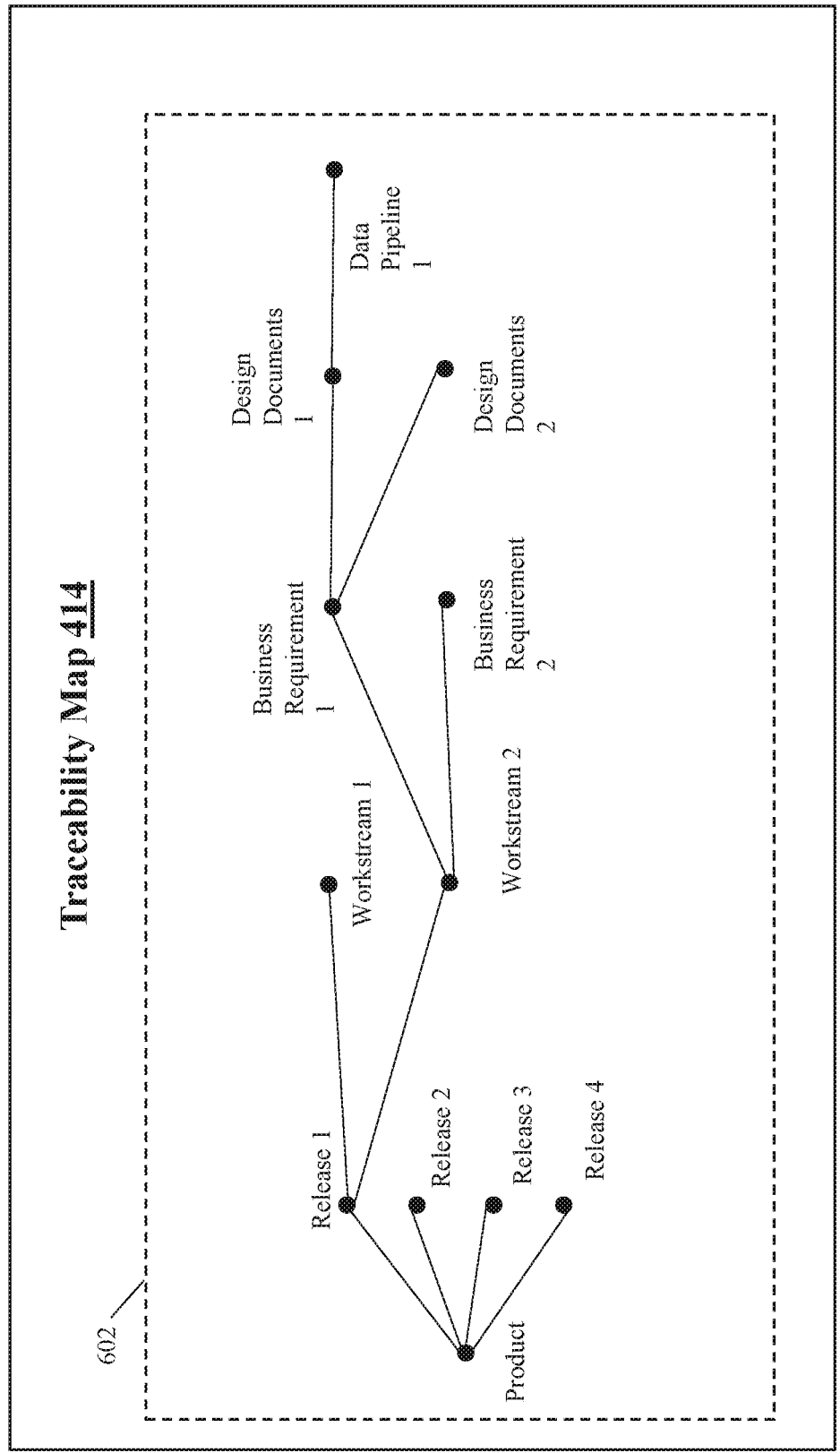
FIG. 6 is a diagram that illustrates a traceability map of FIG. 4, in accordance with an exemplary embodiment of the present disclosure.

FIG. 6 is a diagram 600 that illustrates the traceability map 414, in accordance with an exemplary embodiment of the present disclosure. FIG. 6 is explained in conjunction with FIGS. 2, 3, and 4. The relationship mapper 412 maps each monitored/tracked activity (e.g., the first plurality of user actions) performed in each of the plurality of stages 216. The relationship mapper 412, at each of the plurality of stages 216, determines a relationship between each activity and a workstream, release, or business requirement associated with a corresponding activity. The relationship mapper 412 generates the traceability map 414 based on each monitored/tracked activity (e.g., the first plurality of user actions) in each of the plurality of stages 216 and the recorded progress data of a corresponding technology/corresponding technologies (e.g., the first technology 114a) in each of the plurality of stages 216. The generation of the traceability map 414 is further based on a recorded output of an execution by the corresponding technology/corresponding technologies of a corresponding set of operations (e.g., the first set of operations) in each of the plurality of stages 216.

The traceability map 414 is illustrated in a section 602. The traceability map 414 is shown to include a first node that corresponds to a definition of the software product (e.g., a product for investment banking) in a product portfolio. The traceability map 414 is further shown to include second through fifth nodes that correspond to definition or creation of first through fourth releases (e.g., "Release 1", "Release 2", "Release 3", and "Release 4"). The first through fourth releases may correspond to the plurality of releases of the software product. In a non-limiting example, the first through fourth releases may correspond to an alpha release, a sample release, a beta release, and an general availability (GA) release, respectively. The traceability map 414 is further shown to include sixth and seventh nodes that correspond to definition/creation of first and second workstreams (e.g., "Workstream 1" and "Workstream 2"), respectively. The traceability map 414 is further shown to include eighth and ninth nodes that correspond to the creation of the first and second business requirements (e.g., "Business Requirement 1" and "Business Requirement 2"; the define stage 216a) of the set of business requirements. The first and second business requirements are shown to correspond to (e.g., shown to be correlated to) the second workstream. The traceability map 414 is further shown to include tenth and eleventh nodes that correspond to creation of first and second sets of design documents (e.g., "Design Documents 1" and "Design Documents 2"; the design stage 216b). The creations of the first and second sets of design documents is shown to correspond to the creation of the first business requirement. The traceability map 414 is further shown to include a twelfth node (e.g., "Data Pipeline 1") that correspond to creation of a first data pipeline based on the first set of design documents. The creation of the first data pipeline is shown to be correlated to the creation of the first set of design documents.

It will be apparent to those of skill in the art that traceability map 414 shown in FIG. 1 is merely exemplary. More stages and nodes have not been shown to avoid obscuring the drawings and the disclosure. However, in an actual implementation, the traceability map 414 may be indicative of a causal relationship between activities performed at each of the plurality of stages 216.

Figure 7:
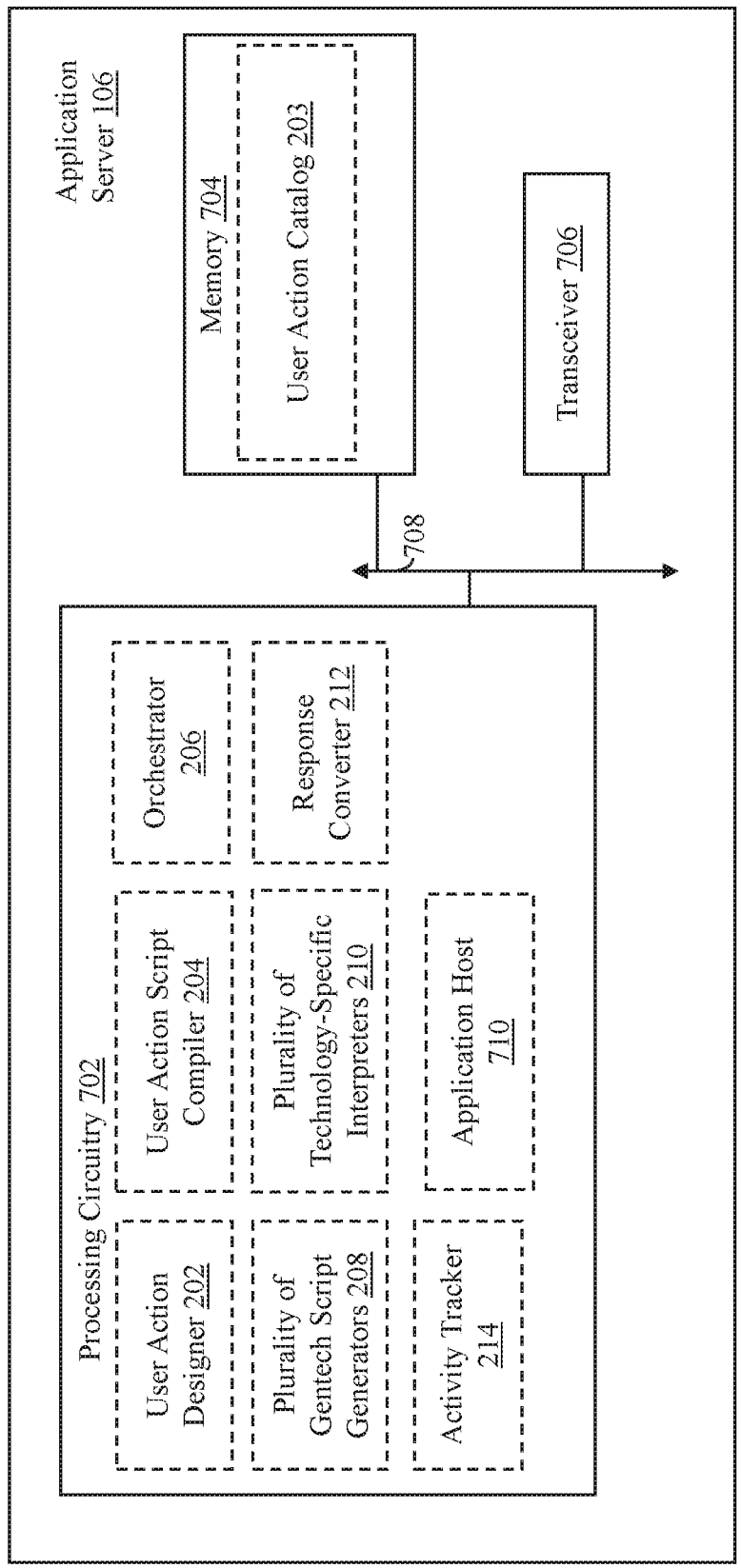
FIG. 7 is a block diagram that illustrates an application server of FIG. 1, in accordance with an exemplary embodiment of the present disclosure.

FIG. 7 is a block diagram that illustrates the application server 106, in accordance with an exemplary embodiment of the present disclosure.

The application server 106 may include processing circuitry 702, the memory (hereinafter, designated and referred to as "the memory 704"), and a transceiver 706. The processing circuitry 702, the memory 704, and the transceiver 706 may communicate with each other by way of a communication bus 708. The processing circuitry 702 may include the user action designer 202, the user action script compiler 204, the orchestrator 206, the plurality of gentech script generators 208, the plurality of technology-specific interpreters 210, the response converter 212, and the activity tracker 214.

The processing circuitry 2702 includes suitable logic, circuitry, interfaces, and/or code, executed by the circuitry, for analysis of a value stream of the software product and for management of technologies (e.g., the first plurality of technologies 114) facilitate the definition, the design, the development, or the deployment (e.g., the plurality of stages 216) of the software product.

Examples of the processing circuitry 2702 may include, but are not limited to, an application-specific integrated circuit ASIC processor, a RISC processor, a complex instruction set computer (CISC) processor, an FPGA, and the like. The processing circuitry 2702 may execute various operations for the management of technologies (e.g., the first plurality of technologies 114) to facilitate the definition, the design, the development, or the deployment (e.g., the plurality of stages 216) of the software product. These operations may be executed by way of components (e.g., modules; the user action designer 202, the orchestrator 206, or the like) included in the processing circuitry 702 as described in the foregoing description of FIGS. 2, 3, and 4.

The application host 710 may be configured to host the service application 112 that is executed on the plurality of user devices 102. Functions of other components included in the processing circuitry 702 have already been covered in the description of earlier figures and are not repeated for the sake of brevity.

The memory 704 may include suitable logic, circuitry, interfaces, and/or code, executable by the circuitry, to store data retrieved by the processing circuitry 702 from the plurality of user devices 102, the plurality of technology servers 104, and/or the database server 108. For example, the memory 704 stores, therein, gentech scripts generated by the plurality of gentech script generators 208, technology-specific scripts generated by the plurality of technology-specific interpreters 210, the value stream map 410, the traceability map 414, or the like. The memory 1504 further stores, therein, for each plurality of user actions performed on the UI rendered by the user action designer 202, a mapping between a corresponding plurality of users actions, gentech scripts generated based on the corresponding plurality of users actions, and/or technology-specific scripts generated based on the corresponding plurality of users actions. The memory 1504 further stores, therein, the value stream map 410 and the traceability map 414.

Examples of the memory 704 may include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 704 in the application server 106, as described herein. In another embodiment, the memory 704 may be realized in form of a database server or a cloud storage working in conjunction with the application server 106, without departing from the scope of the disclosure.

The transceiver 706 may include suitable logic, circuitry, interfaces, and/or code, executable by the circuitry, to transmit and receive data over the communication network 110 using one or more communication network protocols. The transceiver 1506 may transmit and receive requests, messages, information, data to and/or from the plurality of user devices 102, the plurality of technology servers 104, and/or the database server 108. Examples of the transceiver 1506 may include, but are not limited to, an antenna, a radio frequency transceiver, a wireless transceiver, a Bluetooth transceiver, an ethernet port, a universal serial bus (USB) port, or any other device configured to transmit and receive data.

Figure 8:
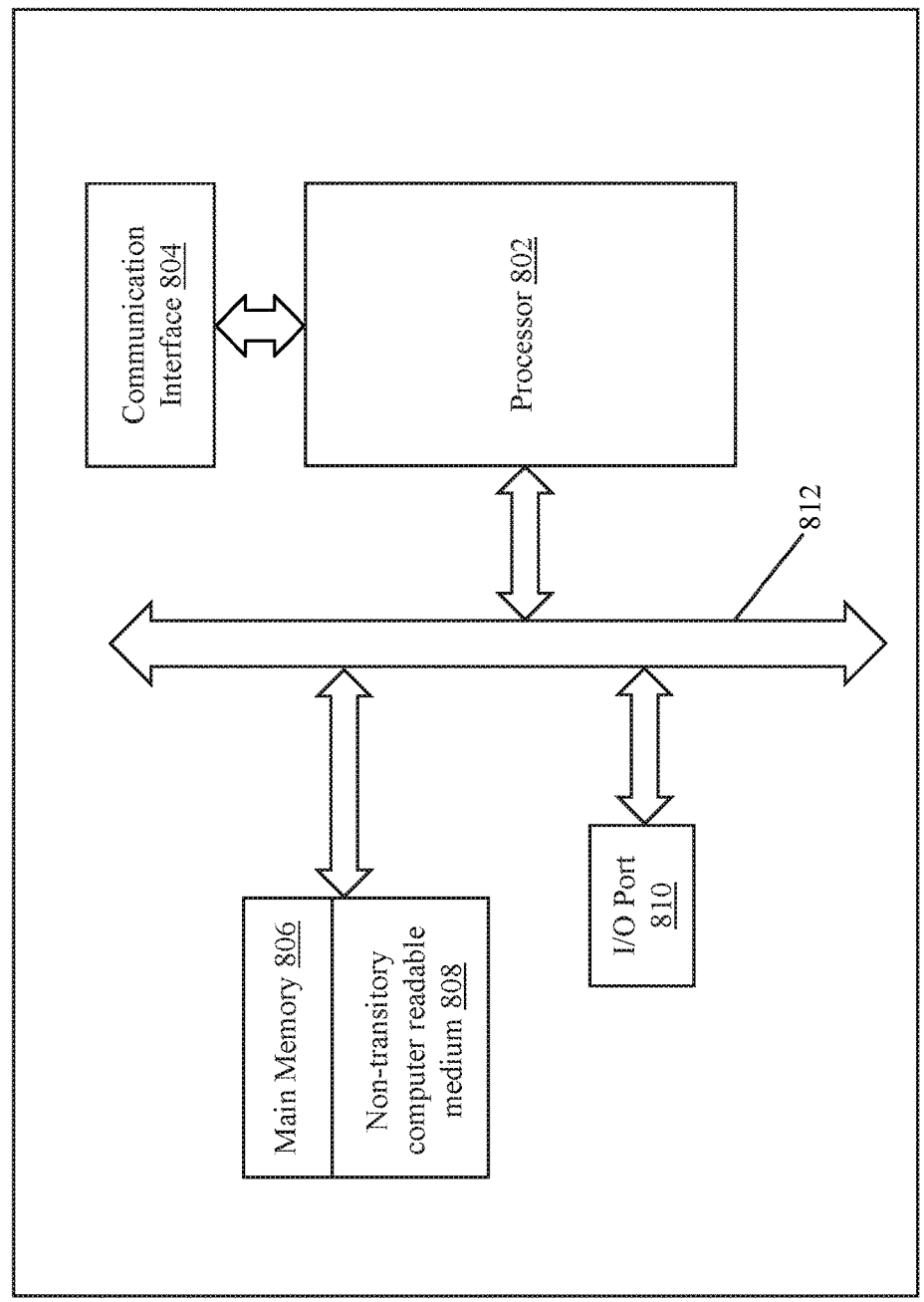
FIG. 8 is a block diagram that illustrates a system architecture of a computer system 1600 that implements the service application 112 hosted by the application server 106, in accordance with an exemplary embodiment of the disclosure.

FIG. 8 is a block diagram that illustrates a system architecture of a computer system 800 that implements the service application 112 hosted by the application server 106, in accordance with an exemplary embodiment of the present disclosure. An embodiment of the disclosure, or portions thereof, may be implemented as computer readable code on the computer system 800. In one example, the plurality of user devices 102, the first plurality of technology servers 104, the application server 106, and the database server 108 and the may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 9 and 10.

The computer system 800 may include a processor 802, a communication interface 804, a main memory 806, a non-transitory computer-readable medium 808, an input/output (I/O) port 810, and a communication infrastructure 812.

The processor 802 may be a special purpose or a general-purpose processing device. The processor 802 may be a single processor or multiple processors. The processor 802 may have one or more processor "cores." Further, the processor 802 may be coupled to the communication interface 804, such as a bus, a bridge, a message queue, the communication network 110, multi-core message-passing scheme, or the like. Examples of the main memory 806 may include RAM, ROM, and the like. The non-transitory computer-readable medium 808 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The I/O port 810 may include various input and output devices that are configured to communicate with the processor 802. Examples of the input devices may include a keyboard, a mouse, a joystick, a touchscreen, a microphone, and the like. Examples of the output devices may include a display screen, a speaker, headphones, and the like. The communication infrastructure 812 may be configured to allow data to be transferred between the computer system 800 and various devices that are communicatively coupled to the computer system 800. Examples of the communication infrastructure 812 may include a modem, a network interface, i.e., an Ethernet card, a communication port, and the like. Data transferred via the communication infrastructure 812 may be signals, such as electronic, electromagnetic, optical, or other signals as will be apparent to a person skilled in the art. The signals may travel via a communications channel, such as the communication network 110, which may be configured to transmit the signals to the various devices that are communicatively coupled to the computer system 800. Examples of the communication channel may include a wired, wireless, and/or optical medium such as cable, fiber optics, a phone line, a cellular phone link, a radio frequency link, and the like. The main memory 806 and the secondary memory 808 may refer to non-transitory computer readable mediums that may provide data that enables the computer system 2800 to implement the methods illustrated in FIGS. 9 and 10.

Figure 9:
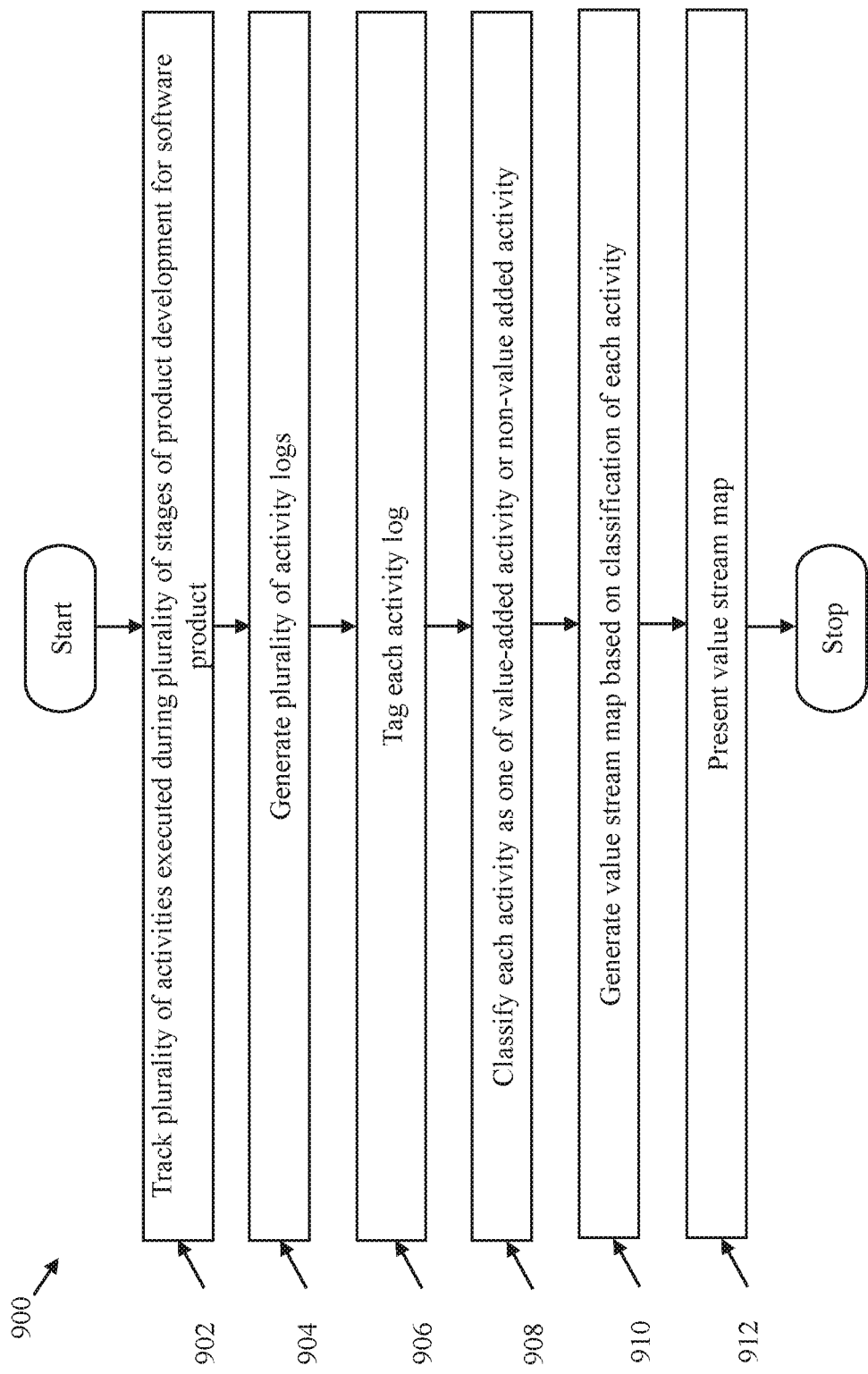
FIG. 9 represents a flow chart that illustrates a method for presenting a value stream map of FIG. 5, in accordance with an exemplary embodiment of the present disclosure.

FIG. 9 represents a flow chart 900 that illustrates a method for presenting the value stream map 410, in accordance with an exemplary embodiment of the present disclosure. FIG. 9 is explained in conjunction with FIG. 4.

At 902, a plurality of activities executed during a plurality of stages of product development for a software product are tracked. For example, the plurality of activities executed during the plurality of stages 216 of the product development for the software product are tracked by the activity watcher 404. The plurality of stages 216 include the define stage 216a, the design stage 216b, the development stage 216c, and the deployment stage 216d. The tracked plurality of activities include the first through fourth sets of activities.

At 904, a plurality of activity logs are generated based on the tracked plurality of activities. For example, the activity watcher 404 may generate the plurality of activity logs (e.g., the first through fourth sets of activity logs) based on the tracked plurality of activities. The activity watcher 404 may communicate the plurality of activity logs to the activity filter 406. At 906, each activity log of the plurality of activity logs is tagged. For example, the activity filter 406 tags each of the plurality of activity logs with one of the plurality of tags. The tag for each activity log, of the plurality of activity logs, is indicative of a correlation between a corresponding activity and one of the plurality of stages 216. The activity filter 406 maps each tagged activity log to one or more releases of the plurality of releases of the software product. The tagging of each activity log of the plurality of activity logs may be based on release train information that is received from the release train tracker 420 and is indicative of the plurality of releases. The activity filter 406 may communicate the tagged plurality of activity logs to the value stream engine 408.

At 908, each activity is classified as one of a value-added activity or a non-value-added activity. For example, the value stream engine 408, based on the tagged plurality of activity logs and the set of rules, classifies each of the plurality of activities (e.g., the first through fourth sets of activities) as one of the value-added activity or the non-value-added activity. At 910, the value stream engine 408 may generate a value stream map based on the classification of each activity. For example, the value stream engine 408 may generate the value stream map 410 based on the classification of each activity of the first through fourth sets of activities. The generated value stream map 410 is indicative of the efficient score for each of the plurality of stages 216. The value stream engine 408 may communicate the value stream map 410 (e.g., metadata associated with the value stream map 410) to the user action designer 202. At 912, the value stream map 410 is presented. For example, the user action designer 202 presents the value stream map 410 on the UI (as shown in FIG. 5).

Figure 10:
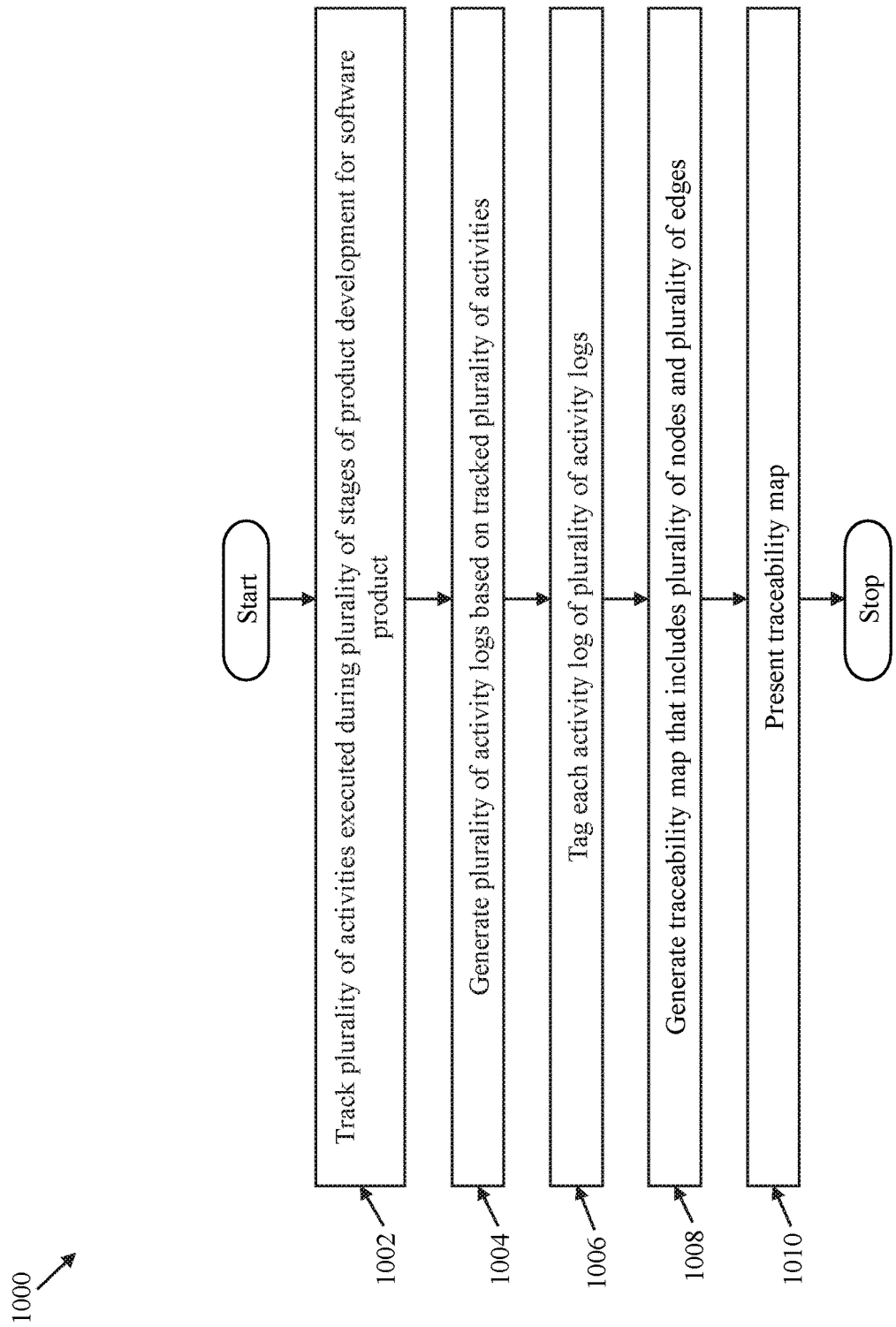
FIG. 10 represents a flow chart that illustrates a method for presenting a traceability map of FIG. 6, in accordance with an exemplary embodiment of the present disclosure.

FIG. 10 represents a flow chart 1000 that illustrates a method for presenting the traceability map 414, in accordance with an exemplary embodiment of the present disclosure. FIG. 10 is explained in conjunction with FIG. 4.

At 1002, a plurality of activities executed during a plurality of stages of product development for a software product are tracked. For example, the plurality of activities executed during the plurality of stages 216 of the product development for the software product are tracked by the activity watcher 404. The plurality of stages 216 include the define stage 216a, the design stage 216b, the development stage 216c, and the deployment stage 216d. The tracked plurality of activities include the first through fourth sets of activities.

At 1004, a plurality of activity logs are generated based on the tracked plurality of activities. For example, the activity watcher 404 may generate the plurality of activity logs (e.g., the first through fourth sets of activity logs) based on the tracked plurality of activities. The activity watcher 404 may communicate the plurality of activity logs to the activity filter 406. At 1006, each activity log of the plurality of activity logs is tagged. For example, the activity filter 406 tags each of the plurality of activity logs with one of the plurality of tags. The tag for each activity log, of the plurality of activity logs, is indicative of a correlation between a corresponding activity and one of the plurality of stages 216. The activity filter 406 maps each tagged activity log to one or more releases of the plurality of releases of the software product. The tagging of each activity log of the plurality of activity logs may be based on the release train information that is received from the release train tracker 420 and is indicative of the plurality of releases. The activity filter 406 may communicate the tagged plurality of activity logs to the relationship mapper 412.

At 1008, a traceability map that includes a plurality of nodes and a plurality of edges is generated. For example, the relationship mapper 412 may generate the traceability map 414 based on the tagged plurality of activity logs and the relationship matrix. Each of the plurality of nodes corresponds to an activity of the first through fourth sets of activities. The relationship matrix is indicative of the correlation among the first through fourth sets of activities. An edge, of the plurality of edges, formed between any two nodes, of the plurality of nodes, is indicative of a correlation between activities that correspond to the two nodes. The relationship mapper 412 may communicate the traceability map 414 (e.g., metadata associated with the traceability map 414) to the user action designer 202. At 1010, the traceability map is presented. Consequently, the user action designer 202 may present the traceability map 414 on the UI (as shown in FIG. 6).

The disclosed embodiments encompass numerous advantages. Exemplary advantages of the disclosed embodiments include, but are not limited to, providing an open pro-code platform (e.g., the service application 112) for execution of various stages (e.g., the define stage 216a, the design stage 216b, the development stage 216c, and the deployment stage 216d) of the SDLC of the software product. The service application 112 disclosed herein enables the plurality of users to execute the various stages of the SDLC of the software product, using a single platform (i.e., the service application 112). The service application 112 supports a plurality of technologies (e.g., the first plurality of technologies 114) that facilitate various operations associated with execution of the various stages of the SDLC of the software product. The service application 112 disclosed herein enables the plurality of users to select one or more technologies of their choice for developing the software product. The service application 112 provides a layer of abstraction on top of the selected technologies (e.g., the first plurality of technologies 114), eliminating a need of the organization to re-hire or re-train the plurality of users for using the selected point technologies and/or technology platforms.

In some scenarios, the organization (e.g., the plurality of scenarios) may select technologies that are already in use or licensed by the organization, facilitating seamless migration to the service application 112 for product development. The service application 112 provides collaboration tools that facilitate collaboration of the plurality of users, various stakeholders of the software product, or the like at every stage of software product development. Therefore, the service application 112 enables the plurality of users and the stakeholders to access a common platform (e.g., the service application 112) and contribute to the development of the software product at each stage of the SDLC.

The service application 112 provides a multi-layer architecture that abstracts interaction of the plurality of users with each selected point technology or technology platform. The layer of abstraction that exists on top of each technology (e.g., the first plurality of technologies 114) enables the plurality of users to access services and features associated with each selected technologies without having to learn nuances of a corresponding technology. Therefore, the service application 112 significantly eliminates a requirement for being aware of technical environment, an underlying technology, or a UI of a selected point technology and/or technology platform for accessing or using a corresponding technology or technology platform. Hence, the service application 112 creates a uniform and consistent experience for the plurality of users for software development irrespective of the technology stack.

The disclosed service application 112 facilitates monitoring of each activity being performed by way of the UI of the service application 112. Based on such monitoring, the service application 112 facilitates generation of value stream maps (e.g., the value stream map 410) that allows for tracking of the SDLC/DALC of the software product and activities performed by the plurality of users on the service application 112. This enables determination of a value (e.g., productivity value) derived from each activity of each user of the plurality of users. Thus, the value stream map 410 enables tracking of productive work and waste of time caused by the plurality of users while using the service application 112. Further, the value stream map 410 provides insights into time leakages at each stage of the SDLC of the software product.

Further, the service application 112 facilitates generation of the traceability map 414 based on tracking/monitoring of various activities/events (such as, code, commit, build, execution, deployment, or any other operation executed by way of the service application 112) associated with the SDLC of the software product. The traceability map 414 enables the plurality of users to trace late-stage events or issues and find corresponding causal factors and events. Therefore, the traceability map 414 provides transparency at each stage of the SDLC of the software product. The generation of the value stream map 410 and the traceability map 414 is completely automated, eliminating a need to manually log actions or activities by each user of the plurality of users. This results in quick generation and analyses of the first through fourth sets of activities. The generated value stream map 410 and the traceability map 414 may present data that corresponds to a single release, multiple releases, or the like of software product, enabling quick derivation of actionable insights.

Therefore, the service application 112 provides for a simplified and seamless technological experience for analysis of a value stream of the software product.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for analysis of the value stream for the software product. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

The invention claimed is:

1. A non-transitory computer-readable medium having stored thereon, computer executable instruction, which when executed by a computer, cause the computer to implement an architecture to monitor development of software products, the architecture comprising:
an activity watcher configured to:
track a plurality of activities executed during a plurality of stages of product development for a software product, wherein the plurality of stages include a definition stage, a design stage, a development stage, and a deployment stage, and wherein the tracked plurality of activities include a first set of activities executed during the definition stage, a second set of activities executed during the design stage, a third set of activities executed during the development stage, and a fourth set of activities executed during the deployment stage;
an activity filter configured to:
receive, from the activity watcher, a plurality of activity logs that include first through fourth sets of activity logs associated with the first through fourth sets of activities, respectively, wherein each activity log of the plurality of activity logs is indicative of a corresponding activity executed in one of the plurality of stages; and
tag each of the plurality of activity logs with one of a plurality of tags, wherein the tag for each activity log is indicative of an association of a corresponding activity log with one of the plurality of stages; and
a value stream engine configured to:
classify each activity of the first through fourth sets of activities as one of a value-added activity or a non-value added activity, based on the plurality of activity logs; and
generate a value stream map for the product development of the software product, based on the classification of each activity of the first through fourth sets of activities, wherein the value stream map is indicative of an efficiency score for each of the plurality of stages.

2. The non-transitory computer-readable medium of claim 1, wherein the architecture further comprises:
an relationship mapper configured to:
generate a plurality of nodes, wherein each of the plurality of nodes corresponds to an activity of the first through fourth sets of activities; and
generate, based on a relationship matrix, a plurality of edges between the plurality of nodes, wherein the relationship matrix is indicative of a correlation among the first through fourth sets of activities, and wherein an edge formed between any two nodes is indicative of a correlation between activities that correspond to the two nodes.

3. The non-transitory computer-readable medium of claim 2, wherein a combination of the plurality of nodes and the plurality of edges corresponds to a traceability map, and wherein the traceability map is indicative of causal relationship between the first through fourth sets of activities.

4. The non-transitory computer-readable medium of claim 3, wherein the architecture further comprises:
a user action designer configured to:
render a user interface (UI) on a user device of a user; and
present the value stream map and the traceability map on the rendered UI.

5. The non-transitory computer-readable medium of claim 1, wherein each activity of the first through fourth sets of activities is linked to a user identifier of a user who initiated a corresponding activity, and wherein each activity log of the first through fourth sets of activity logs includes the user identifier of the user who initiated the corresponding activity.

6. The non-transitory computer-readable medium of claim 1, wherein the activity filter is further configured to:
map, based on release train information associated with a plurality of releases of the software product, each of the tagged plurality of activity logs to one or more releases of the plurality of releases, and wherein the generated value stream map is indicative of an efficiency score for each of the plurality of releases of the software product.

7. The non-transitory computer-readable medium of claim 1, wherein the first set of activities that are executed during the definition stage includes creation of a set of business requirements, creation of a set of agile epics, creation of a set of agile stories, or creation of a set of approval workflows for the set of business requirements.

8. The non-transitory computer-readable medium of claim 1, wherein the second set of activities that are executed during the design stage includes creation of a set of architecture documents for the software product, updating of one or more architecture documents of the set of architecture documents, or creation of a set of approval workflows for the set of architecture documents.

9. The non-transitory computer-readable medium of claim 1, wherein the third set of activities that are executed during the development stage includes selection of a technology stack for development of the software product, usage of a set of editors to write code for the selected technology stack, or creation of a set of approval workflow for the selection of the technology stack.

10. The non-transitory computer-readable medium of claim 1, wherein the fourth set of activities that are executed during the deployment stage includes creation of a set of deployment environments for deploying a plurality of microservices associated with the software product, creation of a set of continuous integration/continuous deployment (CI/CD) pipelines for each of the plurality of microservices, triggering of the set of CI/CD pipelines for each of the plurality of microservices, or provisioning of a set of virtual machines at a cloud technology for the deployment of each of the plurality of microservices.

11. A system to monitor development of software products, comprising:
processing circuitry configured to:
track a plurality of activities executed during a plurality of stages of product development for a software product, wherein the plurality of stages include a definition stage, a design stage, a development stage, and a deployment stage, and wherein the tracked plurality of activities include a first set of activities executed during the definition stage, a second set of activities executed during the design stage, a third set of activities executed during the development stage, and a fourth set of activities executed during the deployment stage;
generate a plurality of activity logs that include first through fourth sets of activity logs associated with the first through fourth sets of activities, respectively, wherein each activity log of the plurality of activity logs is indicative of a corresponding activity executed in one of the plurality of stages;
tag each of the plurality of activity logs with one of a plurality of tags, wherein the tag for each activity log is indicative of an association of a corresponding activity log with one of the plurality of stages;
classify each activity of the first through fourth sets of activities as one of a value-added activity or a non-value added activity, based on the plurality of activity logs; and
generate a value stream map for the product development of the software product, based on the classification of each activity of the first through fourth sets of activities, wherein the value stream map is indicative of an efficiency score for each of the plurality of stages.

12. A method for monitoring development of software products, comprising:
tracking, by processing circuitry, a plurality of activities executed during a plurality of stages of product development for a software product, wherein the plurality of stages include a definition stage, a design stage, a development stage, and a deployment stage, and wherein the tracked plurality of activities include a first set of activities executed during the definition stage, a second set of activities executed during the design stage, a third set of activities executed during the development stage, and a fourth set of activities executed during the deployment stage;
generating, by the processing circuitry, a plurality of activity logs that include first through fourth sets of activity logs associated with the first through fourth sets of activities, respectively, wherein each activity log of the plurality of activity logs is indicative of a corresponding activity executed in one of the plurality of stages;
tagging, by the processing circuitry, each of the plurality of activity logs with one of a plurality of tags, wherein the tag for each activity log is indicative of an association of a corresponding activity log with one of the plurality of stages;
classifying, by the processing circuitry, each activity of the first through fourth sets of activities as one of a value-added activity or a non-value added activity, based on the plurality of activity logs; and
generating, by the processing circuitry, a value stream map for the product development of the software product, based on the classification of each activity of the first through fourth sets of activities, wherein the value stream map is indicative of an efficiency score for each of the plurality of stages.

13. The method of claim 12, further comprising:
generating, by the processing circuitry, a plurality of nodes, wherein each of the plurality of nodes corresponds to an activity of the first through fourth sets of activities; and
generating, by the processing circuitry, based on a relationship matrix, a plurality of edges between the plurality of nodes, wherein the relationship matrix is indicative of a correlation among the first through fourth sets of activities, and wherein an edge formed between any two nodes is indicative of a correlation between activities that correspond to the two nodes.

14. The method of claim 12, wherein a combination of the plurality of nodes and the plurality of edges corresponds to a traceability map, and wherein the traceability map is indicative of causal relationship between the first through fourth sets of activities.

15. The method of claim 12, further comprising:
rendering, by the processing circuitry, a user interface (UI) on a user device of a user; and
presenting, by the processing circuitry, the value stream map and the traceability map on the rendered UI.

16. The method of claim 12, wherein each activity of the first through fourth sets of activities is linked to a user identifier of a user who initiated a corresponding activity, and wherein each activity log of the first through fourth sets of activity logs includes the user identifier of the user who initiated the corresponding activity.

17. The method of claim 12, further comprising:
mapping, by the processing circuitry, based on release train information associated with a plurality of releases of the software product, each of the tagged plurality of activity logs to one or more releases of the plurality of releases, wherein the generated value stream map is indicative of an efficiency score for each of the plurality of releases of the software product.

18. The method of claim 12, wherein the first set of activities that are executed during the definition stage includes creation of a set of business requirements, creation of a set of agile epics, creation of a set of agile stories, or creation of a set of approval workflows for the set of business requirements, and the second set of activities that are executed during the design stage includes creation of a set of architecture documents for the software products, updating of one or more architecture documents of the set of architecture documents, or creation of a set of approval workflows for the set of architecture documents.

19. The method of claim 12, wherein the third set of activities that are executed during the development stage includes selection of a technology stack for development of the software product, usage of a set of editors to write code for the selected technology stack, or creation of a set of approval workflow for the selection of the technology stack.

20. The method of claim 12, wherein the fourth set of activities that are executed during the deployment stage includes creation of a set of deployment environments for deploying a plurality of microservices associated with the software product, creation of a set of continuous integration/continuous deployment (CI/CD) pipelines for each of the plurality of microservices, triggering of the set of CI/CD for each of the plurality of microservices, or provisioning of a set of virtual machines at a cloud technology for the deployment of each of the plurality of microservices.

\* \* \* \* \*